United States Patent
Nakamura et al.

(10) Patent No.: US 8,565,491 B2
(45) Date of Patent: Oct. 22, 2013

(54) IMAGE PROCESSING APPARATUS, IMAGE PROCESSING METHOD, PROGRAM, AND IMAGING APPARATUS

(75) Inventors: Yusuke Nakamura, Chiba (JP); Shinichiro Gomi, Chiba (JP)

(73) Assignee: Sony Corporation, Tokyo (JP)

(*) Notice: Subject to any disclaimer, the term of this patent is extended or adjusted under 35 U.S.C. 154(b) by 142 days.

(21) Appl. No.: 13/036,228

(22) Filed: Feb. 28, 2011

(65) Prior Publication Data

US 2011/0222796 A1  Sep. 15, 2011

(30) Foreign Application Priority Data

Mar. 12, 2010  (JP) ................................. 2010-056255

(51) Int. Cl.
*G06K 9/00* (2006.01)
*H04N 7/14* (2006.01)
*G01N 37/00* (2006.01)

(52) U.S. Cl.
USPC ............. 382/112; 348/14.12; 702/81; 702/84

(58) Field of Classification Search
USPC ................ 382/112, 181, 309; 348/14.12, 92; 700/109; 702/69, 81, 84; 396/38, 46, 396/336, 338, 422, 562, 647
See application file for complete search history.

(56) References Cited

U.S. PATENT DOCUMENTS 6,483,521 B1 * 11/2002 Takahashi et al. ............ 345/630
6,561,423 B2 * 5/2003 Yoshioka ...................... 235/454
7,961,247 B2 * 6/2011 Tatarczyk ..................... 348/370

FOREIGN PATENT DOCUMENTS

JP    2002-197456    7/2002
JP    2003-298882    10/2003

* cited by examiner

*Primary Examiner* — Abolfazl Tabatabai
(74) *Attorney, Agent, or Firm* — Finnegan, Henderson, Farabow, Garrett & Dunner, L.L.P.

(57) ABSTRACT

An apparatus for evaluating the quality of an input image is disclosed. The apparatus may include a composition pattern selection unit configured to select a composition pattern based on an attribute of the input image. The apparatus may also include a composition evaluation unit configured to evaluate the input image based on the composition pattern and the attribute. Additionally, the apparatus may include an evaluation result output unit configured to output to a display the input image and an indication of a result of the evaluation.

22 Claims, 25 Drawing Sheets

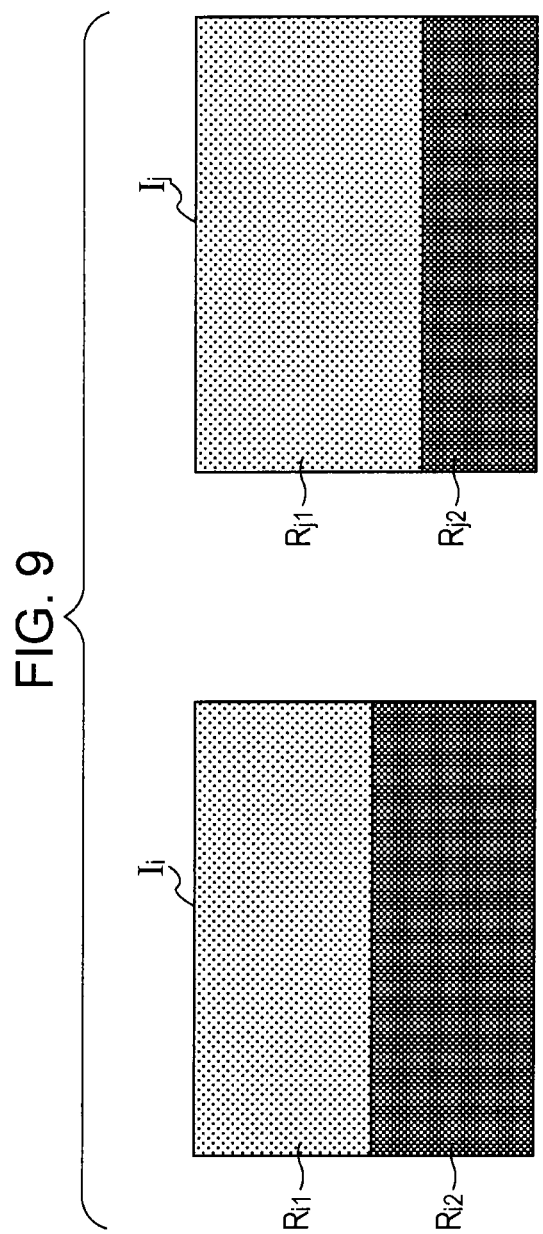

FIG. 10

| SCENE / NUMBER OF NOTICE AREAS | SEASHORE | RURAL SCENERY | SKY | MOUNTAIN | HIGHWAY | STREET | DOWNTOWN | SKYSCRAPER |
|---|---|---|---|---|---|---|---|---|
| 0 | HORIZONTAL COMPOSITION | RADIAL COMPOSITION | HORIZONTAL COMPOSITION | DIAGONAL COMPOSITION | RADIAL COMPOSITION | PERSPECTIVE COMPOSITION | VERTICAL COMPOSITION | VERTICAL COMPOSITION |
| 1 | 3-DIVISION COMPOSITION HORIZONTAL COMPOSITION | 3-DIVISION COMPOSITION RADIAL COMPOSITION | 3-DIVISION COMPOSITION | 3-DIVISION COMPOSITION DIAGONAL COMPOSITION | 3-DIVISION COMPOSITION RADIAL COMPOSITION | 3-DIVISION COMPOSITION PERSPECTIVE COMPOSITION | 3-DIVISION COMPOSITION VERTICAL COMPOSITION | 3-DIVISION COMPOSITION VERTICAL COMPOSITION |
| 2~5 | CONTRAST COMPOSITION HORIZONTAL COMPOSITION | CONTRAST COMPOSITION RADIAL COMPOSITION | CONTRAST COMPOSITION RADIAL COMPOSITION | CONTRAST COMPOSITION DIAGONAL COMPOSITION | CONTRAST COMPOSITION RADIAL COMPOSITION | CONTRAST COMPOSITION PERSPECTIVE COMPOSITION | CONTRAST COMPOSITION VERTICAL COMPOSITION | VERTICAL COMPOSITION RADIAL COMPOSITION |
| 6~ | CONTRAST COMPOSITION HORIZONTAL COMPOSITION | RADIAL COMPOSITION PATTERN COMPOSITION | RADIAL COMPOSITION | CONTRAST COMPOSITION DIAGONAL COMPOSITION | RADIAL COMPOSITION | PERSPECTIVE COMPOSITION | CONTRAST COMPOSITION VERTICAL COMPOSITION | RADIAL COMPOSITION |

IMAGE PROCESSING APPARATUS, IMAGE PROCESSING METHOD, PROGRAM, AND IMAGING APPARATUS

CROSS-REFERENCE TO RELATED APPLICATION

This application claims priority of Japanese Patent Application No. 2010-056255, filed on Mar. 12, 2010, the entire content of which is hereby incorporated by reference.

BACKGROUND

1. Technical Field

The present disclosure relates to an image processing apparatus, an image processing method, a program, and an imaging apparatus, and more particularly, to an image processing apparatus, an image processing method, a program, and an imaging apparatus capable of further improving the photography technique of a user.

2. Description of the Related Art

In the past, there was suggested a technique capable of evaluating images captured by an imaging apparatus such as a digital camera.

For example, a system evaluating the captured images by comparing the captured images with sample images stored in a server via a network was suggested (for example, see Japanese Unexamined Patent Application Publication No. 2002-197456).

In this technique, however, since it is necessary to establish connection to a network, there is restriction on the usage environment of an imaging apparatus. Moreover, since a great number of sample images have to be prepared to perform wider evaluation, the size of the system or the apparatus may be increased. Therefore, it is not easy to implement the evaluation with a single imaging apparatus.

Accordingly, a digital camera capable of evaluating an image with a single imaging apparatus and giving a high evaluation score when a main subject is located within a golden section rectangle in image data was suggested (for example, see Japanese Unexamined Patent Application Publication No. 2003-298882).

SUMMARY

However, the composition of an image evaluated by the technique disclosed in Japanese Unexamined Patent Application Publication No. 2003-298882 is only a so-called sun-shaped circle composition. The sun-shaped circle composition is a stable composition highlighting the presence of a subject, but may tend to become monotonous and uninteresting. In the technique disclosed in Japanese Unexamined Patent Application Publication No. 2003-298882, only the sun-shaped circle composition is taken into consideration. Therefore, a user may be bored by the evaluation. Moreover, since another composition is not evaluated, a photography technique may not be improved.

It is desirable to provide an image processing apparatus, an image processing method, a program, and an imaging apparatus capable of further improving the photography technique of a user.

Accordingly, there is disclosed an apparatus for evaluating the quality of an input image. The apparatus may include a composition pattern selection unit configured to select a composition pattern based on an attribute of the input image. The apparatus may also include a composition evaluation unit configured to evaluate the input image based on the composition pattern and the attribute. Additionally, the apparatus may include an evaluation result output unit configured to output to a display the input image and an indication of a result of the evaluation.

There is also disclosed a method for evaluating the quality of an input image. A processor may execute a program to cause an apparatus to perform the method. The program may be stored on a computer-readable storage medium. The method may include selecting a composition pattern based on an attribute of the input image. Additionally, the method may include evaluating the input image based on the composition pattern and the attribute. The method may also include outputting to a display the input image and an indication of a result of the evaluation.

Additionally, there is disclosed an imaging apparatus. The imaging apparatus may include an imaging unit configured to capture an image. The imaging apparatus may also include an image processing unit configured to process the captured image. Additionally, the imaging apparatus may include a composition pattern selection unit configured to select a composition pattern based on an attribute of the processed image. The imaging apparatus may also include a composition evaluation unit configured to evaluate the processed image based on the composition pattern and the attribute. In addition, the imaging apparatus may include a display. The imaging apparatus may also include an evaluation result output unit configured to output to the display the processed image and an indication of a result of the evaluation.

There is also disclosed a method for capturing and evaluating the quality of an image. The method may include capturing the image and processing the captured image. The method may also include selecting a composition pattern based on an attribute of the processed image. Additionally, the method may include evaluating the processed image based on the composition pattern and the attribute. The method may also include outputting to a display the processed image and an indication of a result of the evaluation.

BRIEF DESCRIPTION OF THE DRAWINGS

FIG. 9 is a diagram illustrating color information of an input image and an area image.

FIG. 10 is a diagram illustrating a composition pattern set based on the number of notice areas and a scene.

DETAILED DESCRIPTION

Hereinafter, embodiments of the invention will be described with reference to the drawings. The description of the embodiments will be made in the following order.

1. First Embodiment (example in which an input image is evaluated as an image of 3-division composition)

2. Second Embodiment (example in which an input image is evaluated as an image of contrast composition)

3. Third Embodiment (example in which an input image is evaluated as an image of diagonal composition)

4. Fourth Embodiment (example applied to an imaging apparatus)

1. First Embodiment

Exemplary Configuration of Image Processing Apparatus

Figure 1:
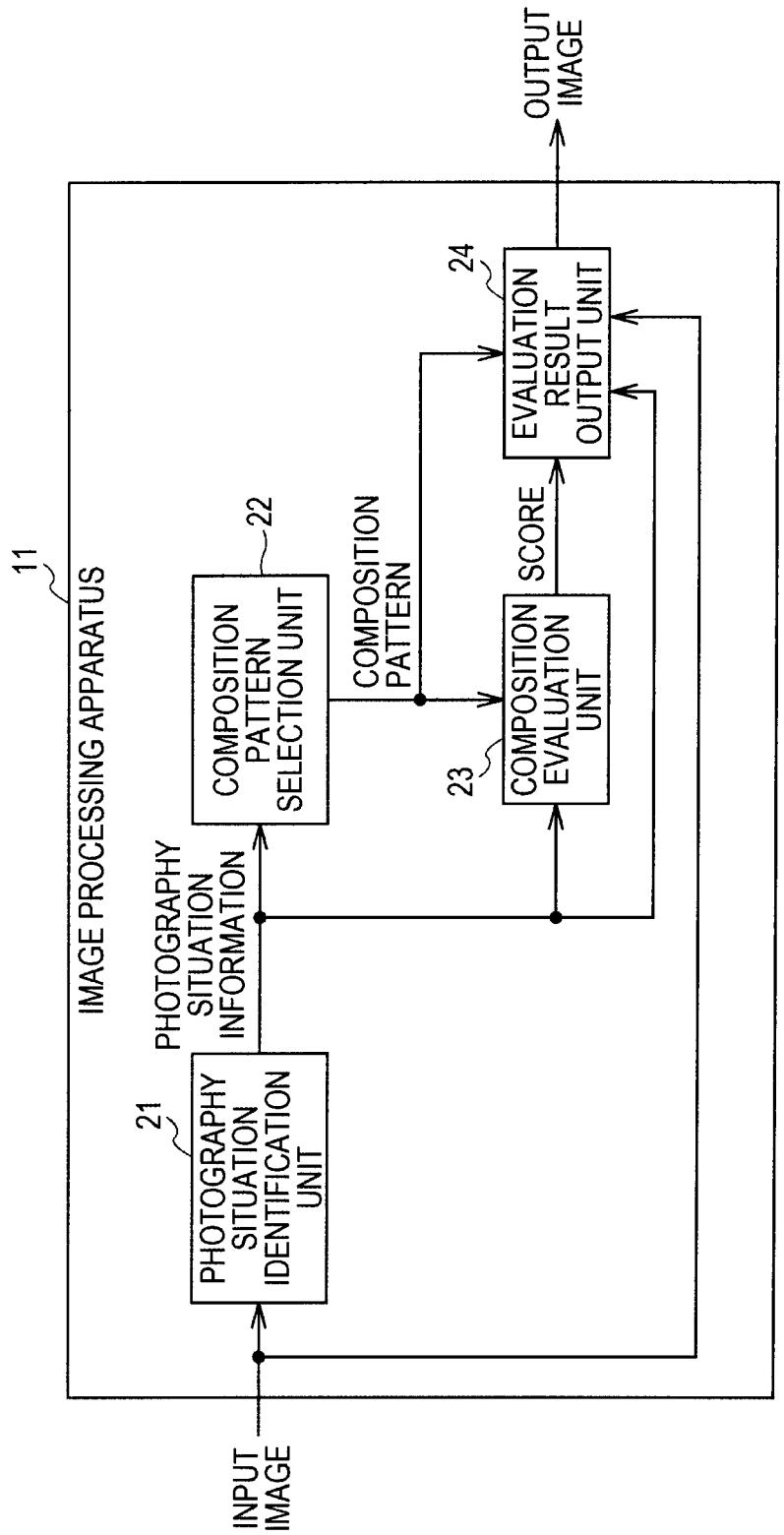
FIG. 1 is a block diagram illustrating an exemplary function configuration of an image processing apparatus consistent with an embodiment of the invention.

FIG. 1 is a diagram illustrating an exemplary function configuration of an image processing apparatus consistent with an embodiment of the invention.

An image processing apparatus 11 in FIG. 1 selects a composition pattern depending on the photography situation of an input image input from an imaging apparatus such as a digital still camera and evaluates the input image by evaluating the composition of the input image based on the photography situation and the composition pattern.

The image processing apparatus 11 includes a photography situation identification unit 21, a composition pattern selection unit 22, a composition evaluation unit 23, and an evaluation result output unit 24.

The input image input to the image processing apparatus 11 is supplied to the photography situation identification unit 21 and the evaluation result output unit 24.

The photography situation identification unit 21 identifies a photography situation, which is obtained when the input image is photographed (captured), from the input image and supplies photography situation information (i.e., one or more attributes of the input image) indicating the photography situation to the composition pattern selection unit 22, the composition evaluation unit 23, and the evaluation result output unit 24. The photography situation is determined and identified by a subject or a scene and a color in the input image.

Exemplary Function Configuration of Photography Situation Identification Unit

Figure 2:
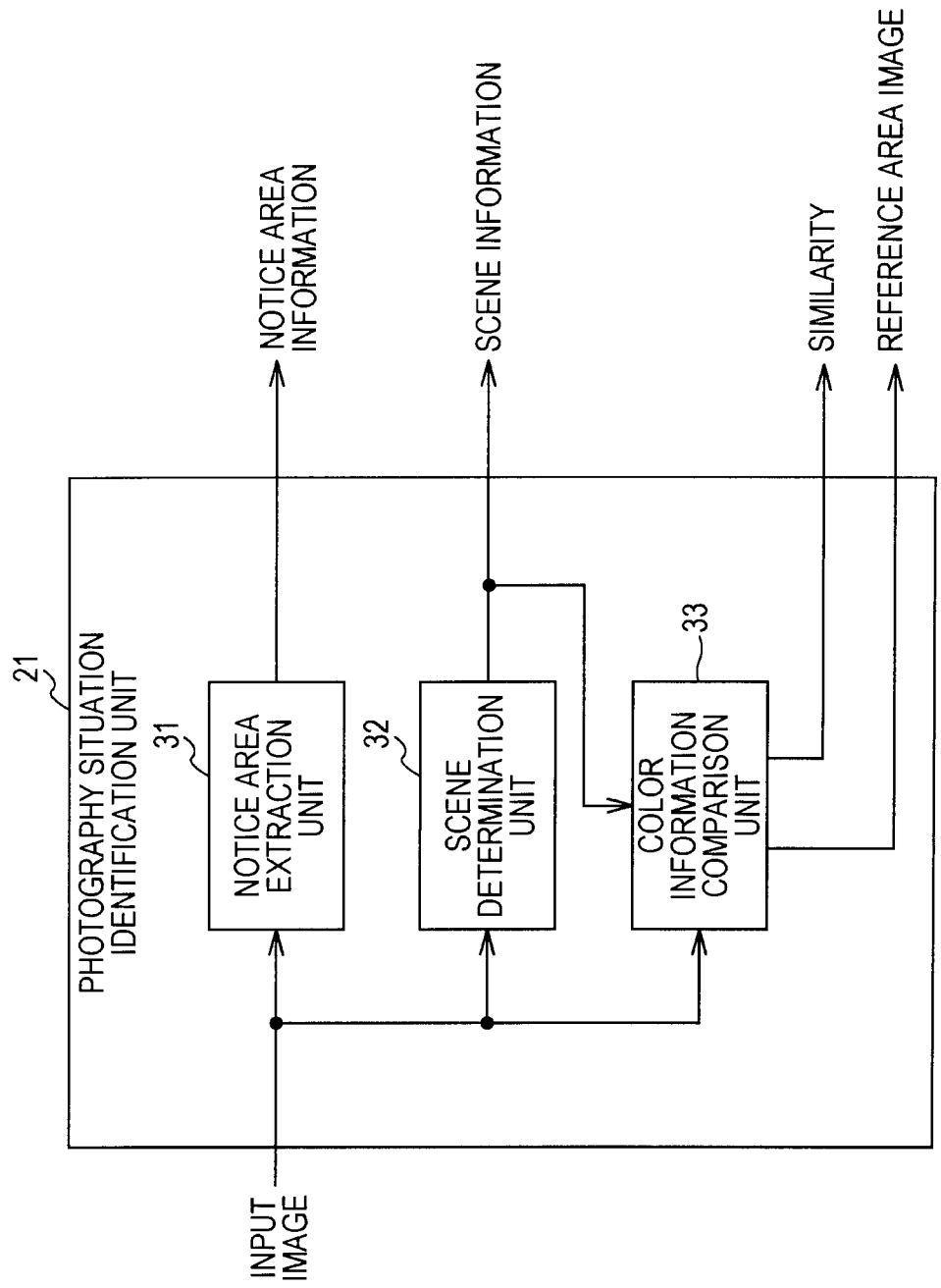
FIG. 2 is a block diagram illustrating an exemplary function configuration of a photography situation identification unit (i.e., a software module, a hardware module, or a combination of a software module and a hardware module).

FIG. 2 is a diagram illustrating an exemplary function configuration of the photography situation identification unit 21.

The photography situation identification unit 21 includes a notice area extraction unit 31, a scene determination unit 32, and a color information comparison unit 33.

The notice area extraction unit 31 extracts a notice area (i.e., a subject area) noticed in the input image and supplies notice area information indicating the notice area to the composition pattern selection unit 22. The notice area is a rectangular area containing (surrounding) a subject (object) in the input image and the notice areas are set and extracted by the number of subjects in the input image. The notice area information is assumed to be, for example, the position of a vertex of the rectangular area.

Exemplary Function Configuration of Notice Area Extraction Unit

Figure 3:
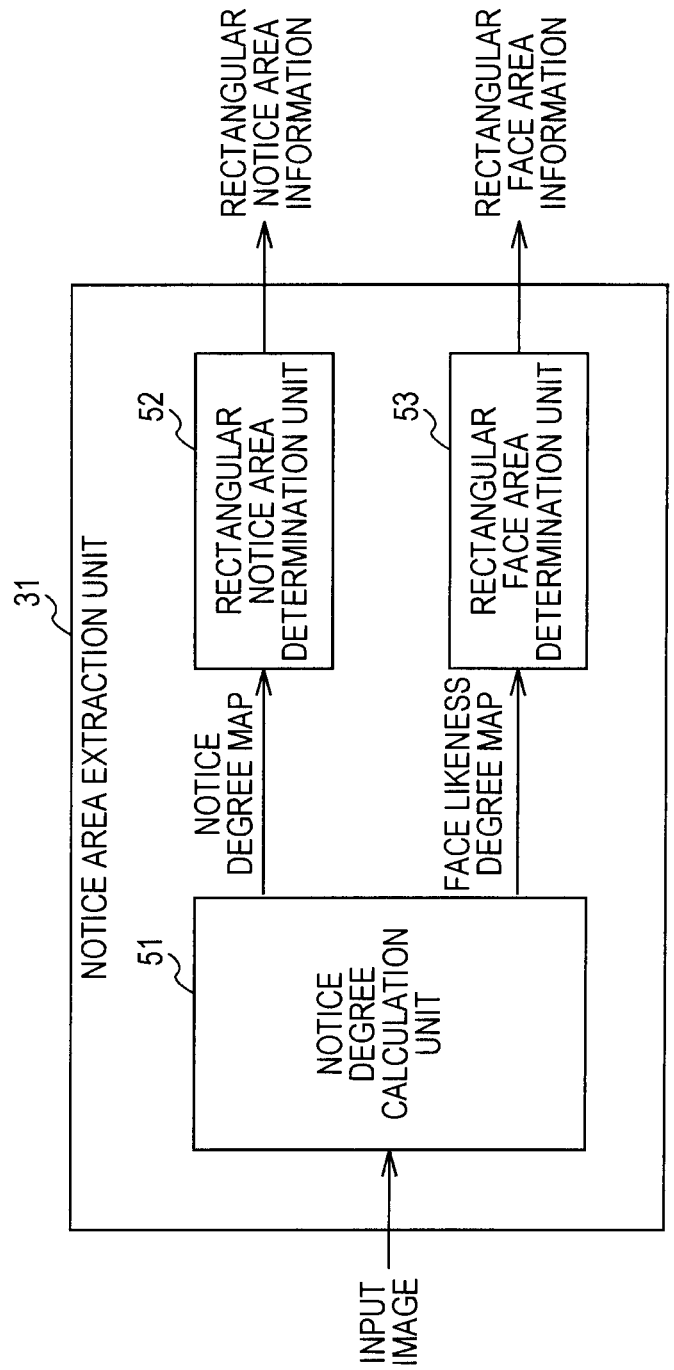
FIG. 3 is a block diagram illustrating an exemplary function configuration of a notice area extraction unit (i.e., a subject area determination unit).

FIG. 3 is a diagram illustrating an exemplary function configuration of the notice area extraction unit 31.

The notice area extraction unit 31 includes a notice degree calculation unit 51, a rectangular notice area determination unit 52, and a rectangular face area determination unit 53.

The notice degree calculation unit 51 calculates a feature of each pixel of the input image and calculates a notice degree of each pixel from the feature. Here, the feature is the size of an edge component of an image, a difference between hues of a pixel and an adjacent pixel, a color distribution in a predetermined area of an image, a difference between an average color of the entire image and a hue of each pixel, and the like. The notice degree calculation unit 51 generates a notice degree map corresponding to one input image from the notice degree (feature) of each pixel and supplies the notice degree map to the rectangular notice area determination unit 52. In other words, the notice degree map generated by the notice degree calculation unit 51 is information indicating an area where a subject to be noticed in one input image is included.

The notice degree calculation unit 51 calculates a face likeness degree (face similarity degree) from the feature calculated for each pixel of the input image, generates a face likeness degree map corresponding to one input image, and supplies the face likeness degree map to the rectangular face area determination unit 53. In other words, the face likeness degree map generated by the notice degree calculation unit 51 is information indicating an area where a face to be noticed in one input image is included.

The rectangular notice area determination unit 52 determines a rectangular notice area based on the notice degree map from the notice degree calculation unit 51 and supplies rectangular notice area information indicating the rectangular notice area to the composition pattern selection unit 22 and the composition evaluation unit 23. More specifically, the rectangular notice area determination unit 52 determines the rectangular notice area by setting a pixel (position) with a notice degree higher than a predetermined threshold value based on the notice degree map as the center point of a rectangle and setting a pixel (position) with a notice degree lower than another threshold value in the vicinity of the center position as an end point (vertex) of the rectangle.

When a predetermined distance between the center points of the rectangles is smaller than a predetermined distance in a case where a plurality of the rectangular notice areas is determined, the minimum rectangular area including the center points of the rectangles is set as the rectangular notice area.

The rectangular face area determination unit 53 determines the rectangular face area based on the face likeness degree map from the notice degree calculation unit 51 and supplies rectangular face area information indicating the rectangular face area to the composition pattern selection unit 22 and the composition evaluation unit 23. More specifically, the rectangular face area determination unit 53 determines the rectangular face area by setting pixels (position) of the nose of a face as the center point of a rectangle and setting pixels (positions) abruptly varied (lowered) in the face likeness degree in the vicinity of the center position as end points (vertexes) of the rectangle.

The rectangular notice area information obtained from the rectangular notice area determination unit 52 and the rectangular face area information obtained from the rectangular face area determination unit 53 are together referred to as notice area information.

Referring back to FIG. 2, the scene determination unit 32 extracts frequency information by frequency-converting the input image, determines a scene of the input image using the frequency information as the feature (vector), and supplies scene information indicating the scene obtained through the determination result to the color information comparison unit 33, the composition pattern selection unit 22, and the evaluation result output unit 24. More specifically, the scene determination unit 32 determines the scene using a learning image set in advance and machine learning such as SVM (Support Vector Machine).

In the SVM, 2-class determination (one-to-one determination) is performed. For example, a "seashore" class and other classes, a "rural scenery" class and other classes, a "sky" class and the other classes, a "mountain" class and other classes, and the like are determined. Then, respective scores are compared to each other and the class with the highest score is obtained as the determination result.

The scene determination unit 32 uses an SVM, but the invention is not limited thereto. For example, pattern recognition using a neural network or pattern recognition using pattern matching may be used.

The color information comparison unit 33 compares information (color information) regarding the color of a prepared area image, which is prepared in advance in correspondence with a scene expressed by the scene information from the scene determination unit 32, to color information regarding the input image and calculates similarity between the area image and the input image. The area image is an image organized by color areas (color areas) of colors obtained in a predetermined scene image. A plurality of the area images is prepared for each scene expressed by the scene information.

Exemplary Function Configuration of Color Information Comparison Unit

Figure 4:
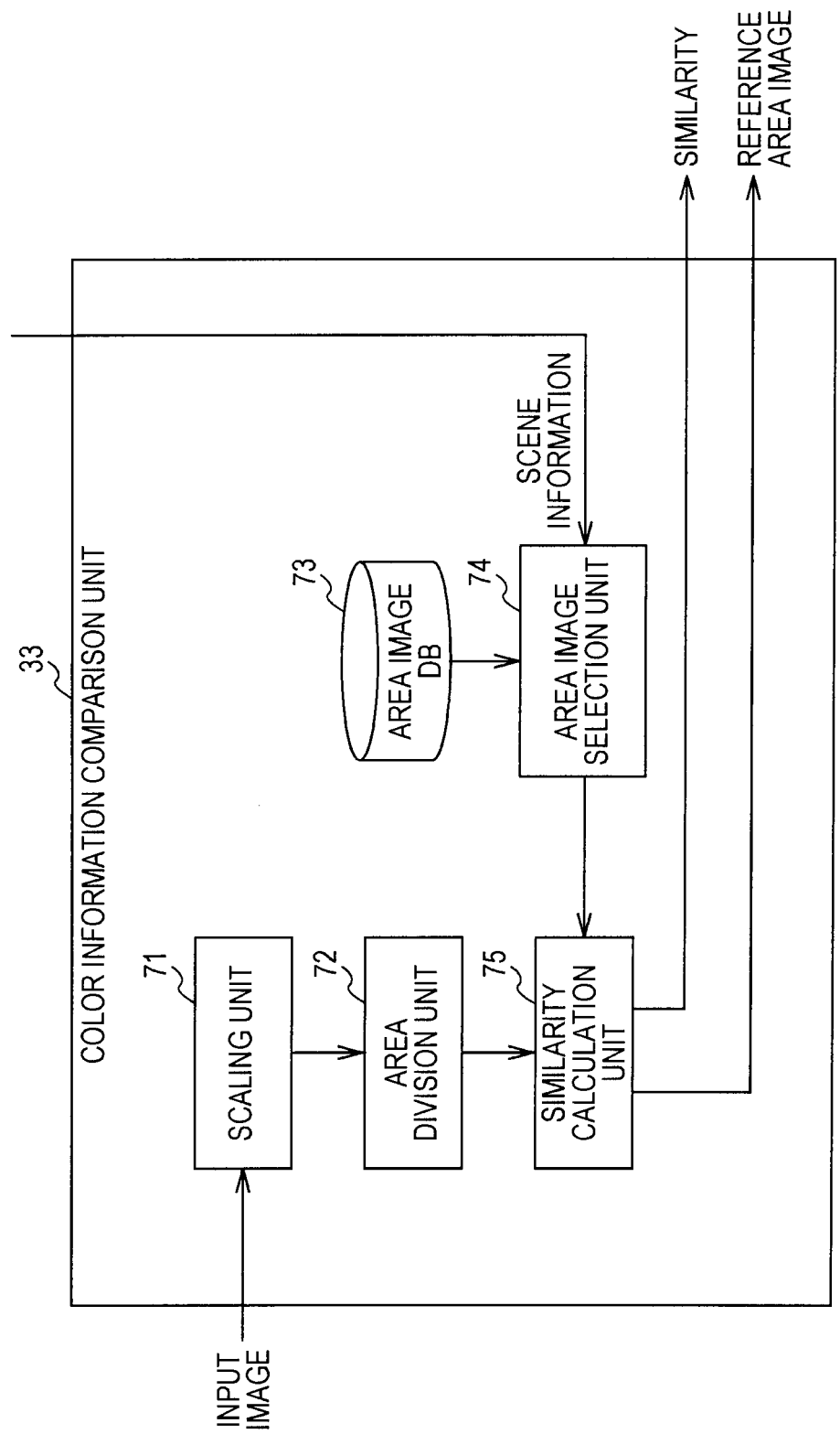
FIG. 4 is a block diagram illustrating an exemplary function configuration of a color information comparison unit.

FIG. 4 is a diagram illustrating an exemplary function configuration of the color information comparison unit 33.

The color information comparison unit 33 includes a scaling unit 71, an area division unit 72, an area image DB (Database) 73, an area image selection unit 74, and a similarity calculation unit 75.

The scaling unit 71 performs a scaling process on the input image and supplies the processed input image to the area division unit 72. Here, the scaling process refers to a process of changing the size of the input image into the same size as the size of an area image.

The area division unit 72 divides the input image supplied from the scaling unit 71 into color areas with the same color or similar colors, and supplies the color areas to the similarity calculation unit 75.

The area image DB 73 stores the plurality of area images for each scene expressed by the scene information. The area images stored in the area image DB 73 are unified so as to have a predetermined size and are read by the area image selection unit 74, as necessary.

The area image selection unit 74 reads the area images of the scene expressed by the scene information from the area image DB 73 based on the scene information from the scene determination unit 32, and supplies the area images to the similarity calculation unit 75.

The similarity calculation unit 75 compares the input image from the area division unit 72 to the area images from the area image selection unit 74, and determines the area image which is the most similar to the input image in a color layout. Specifically, the similarity calculation unit 75 calculates a similarity between the color area of the area images from the area image selection unit 74 and the color area of the input image, and determines the area image (hereinafter, referred to as a reference area image) with the highest similarity among the area images. The similarity calculation unit 75 supplies the similarity between the input image and the reference area image to the composition evaluation unit 23 and also supplies the reference area image to the evaluation result output unit 24.

Information including the notice area information obtained by the notice area extraction unit 31, the scene information obtained by the scene determination unit 32, and at least one of the similarity obtained by the color information comparison unit 33 and the reference area image is referred to as photography situation information.

Referring back to FIG. 1, the composition pattern selection unit 22 selects the composition pattern to be applied to the input image based on the photography situation expressed by the photography situation information from the photography situation identification unit 21. Specifically, the composition pattern selection unit 22 selects the composition pattern corresponding to the input image based on at least one of the number of notice area information from the notice area extraction unit 31 and the scene information from the scene determination unit 32, and supplies the composition pattern to the composition evaluation unit 23 and the evaluation result output unit 24. The composition pattern is determined in advance in correspondence with the number of notice areas (subjects) and the scene. The composition pattern will be described in detail below with reference to FIG. 10.

The composition evaluation unit 23 evaluates the composition of the input image input to the image processing apparatus 11 based on the photography situation information from the photography situation identification unit 21 and the composition pattern from the composition pattern selection unit 22, and supplies a score calculated by quantifying the evaluation result to the evaluation result output unit 24.

Exemplary Function Configuration of Composition Evaluation Unit

Figure 5:
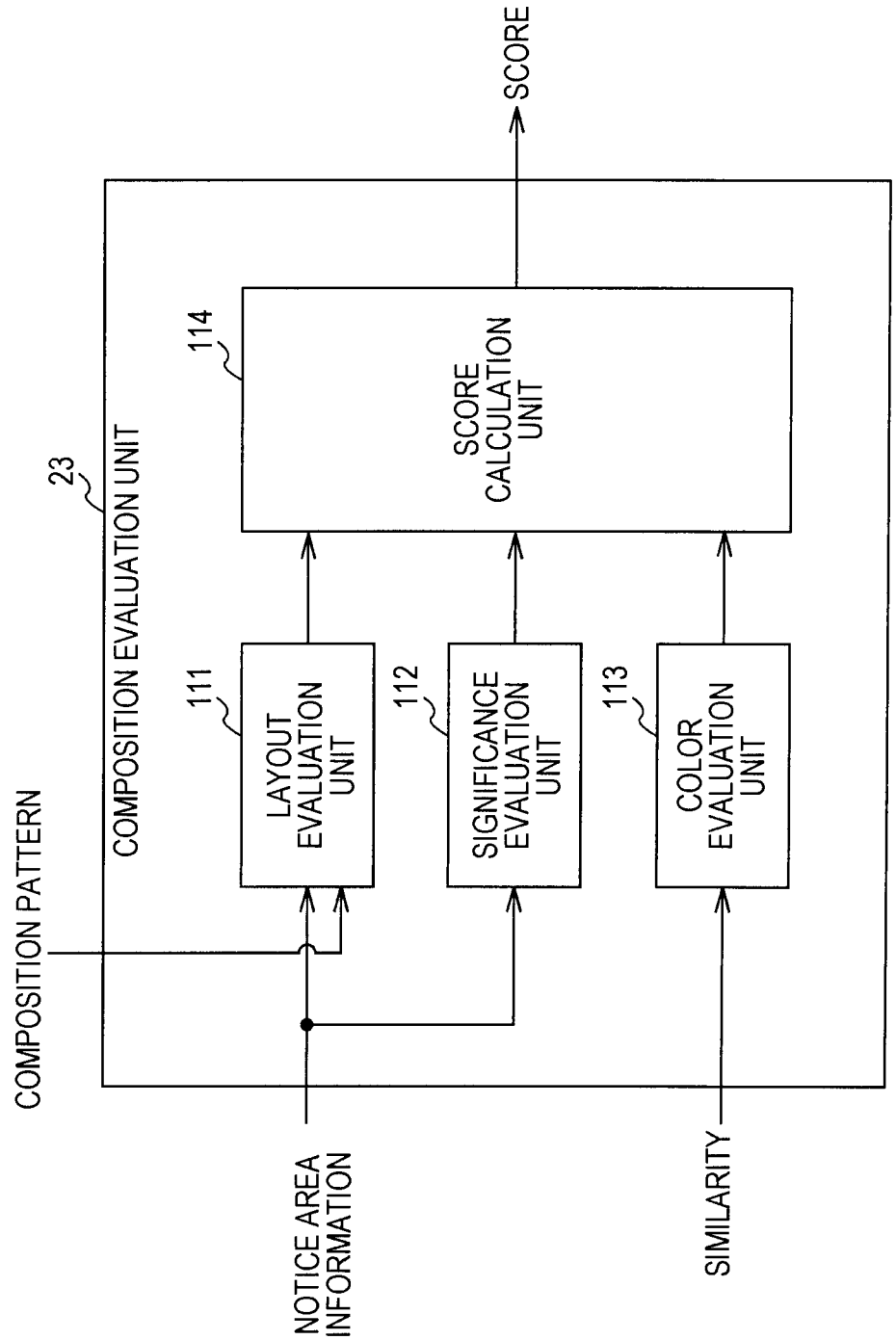
FIG. 5 is a block diagram illustrating an exemplary function configuration of a composition evaluation unit.

FIG. 5 is a diagram illustrating an exemplary function configuration of the composition evaluation unit 23.

The composition evaluation unit 23 includes a layout evaluation unit 111, a significance evaluation unit 112, a color evaluation unit 113, and a score calculation unit 114.

Based on the composition pattern from the composition pattern selection unit 22 and the position and size of the notice area (i.e., information about the notice area) expressed by the notice area information from the notice area extraction unit 31 (see FIG. 2), the layout evaluation unit 111 evaluates the layout of the notice area (i.e., the layout quality) when the composition pattern is applied to the input image. The layout evaluation unit 111 supplies a layout element as the evaluation result to the score calculation unit 114.

The significance evaluation unit 112 evaluates a significance of the notice area in the input image based on the notice degree (or the face likeness degree) of the notice area (i.e., information about the notice area) expressed by the notice area information from the notice area extraction unit 31 (see FIG. 2), and supplies a significance element as the evaluation result to the score calculation unit 114.

Based on the similarity (similarity between the input image and the reference area image) from the color information comparison unit 33 (see FIG. 2), the color evaluation unit 113 evaluates how much the color (color information) of the input image is suitable for the scene determined by the scene determination unit 32 (i.e., the color evaluation unit 113 evaluates a color quality of the input image). The color evaluation unit 113 supplies a color element as the evaluation result to the score calculation unit 114.

The score calculation unit 114 calculates the evaluation result of the composition of the input image as a score by weighting and adding the layout element from the layout evaluation unit 111, the significance element from the significance evaluation unit 112, and the color element from the color evaluation unit 113, and supplies the evaluation result to the evaluation result output unit 24.

The layout element, the significance element, and the color element will be described in detail below.

Referring back to FIG. 1, the evaluation result output unit 24 outputs the score from the composition evaluation unit 23 (i.e., the result of the evaluation), the photography situation information (the scene information and the reference area image) from the photography situation identification unit 21, and the composition pattern from the composition pattern selection unit 22 together with the input image to a display apparatus or the like (not shown).

Image Evaluation Process of Image Processing Apparatus

Next, an image evaluation process of the image processing apparatus 11 in FIG. 1 will be described with reference to the flowchart of FIG. 6.

In step S11, the photography situation identification unit 21 performs a photography situation identification process to identify the photography situation, in which the input image is photographed, from the input image. Then, the photography situation identification unit 21 supplies the photography situation information indicating the photography situation to the composition pattern selection unit 22, the composition evaluation unit 23, and the evaluation result output unit 24.

Photography Situation Identification Process of Photography Situation Identification Unit Hereinafter, the photography situation identification process of step S11 in the flowchart of FIG. 6 will be described with reference to the flowchart of FIG. 7.

In step S31, the notice area extraction unit 31 generates the notice degree map and the face likeness degree map corresponding to the input image. More specifically, the notice degree calculation unit 51 generates the notice degree map corresponding to the input image and supplies the notice degree map to the rectangular notice area determination unit 52. In addition, the notice degree calculation unit 51 generates the face likeness degree map corresponding to the input image supplies the face likeness degree map to the rectangular face area determination unit 53.

In step S32, the notice area extraction unit 31 extracts and determines the notice area noticed in the input image based on the notice degree map and the face likeness degree map. More specifically, the rectangular notice area determination unit 52 determines the rectangular notice area based on the notice degree map from the notice degree calculation unit 51, and supplies the rectangular notice area information indicating the rectangular notice area to the composition pattern selection unit 22 and the composition evaluation unit 23. The rectangular face area determination unit 53 determines the rectangular face area based on the face likeness degree map from the notice degree calculation unit 51, and supplies the rectangular face area information indicating the rectangular face area to the composition pattern selection unit 22 and the composition evaluation unit 23.

In step S32, the rectangular notice area and the rectangular face area are determined as the notice area. However, the rectangular face area may be collectively processed as the rectangular notice area.

In step S33, the scene determination unit 32 extracts frequency information by frequency-converting the input image, determines the scene of the input image using the frequency information as the feature (vector), and supplies the scene information indicating the scene obtained as the determination result to the color information comparison unit 33, the composition pattern selection unit 22, and the evaluation result output unit 24.

In step S34, the color information comparison unit 33 performs a color information comparison process on the input image to compare the color information of the area image corresponding to the scene expressed by the scene information from the scene determination unit 32 to the color information of the input image, and calculates the similarity between the area image and the input image.

Color Information Comparison Process of Color Information Comparison Unit

Hereinafter, the color information comparison process of step S34 in the flowchart of FIG. 7 will be described with reference to the flowchart of FIG. 8.

In step S51, the scaling unit 71 performs a scaling process on the input image to change the size of the input image into the same size as the size of the area image stored in the area image DB 73, and supplies the result to the area division unit 72.

In step S52, the area division unit 72 divides the input image subjected to the scaling process by the scaling unit 71 into color areas with the same color or similar colors, and supplies the color areas to the similarity calculation unit 75. The area division by the colors of an image is performed according to a method of using a mean shift algorithm which is disclosed in "Mean Shift: A Robust Approach toward Feature Space Analysis, Dorin Comaniciu et al., IEEE Transactions on Pattern Analysis and Machine Intelligence, vol. 25, no. 5, 2003". Of course, the area division by the colors may be implemented according to other methods.

In step S53, the area image selection unit 74 reads the area image of the scene expressed by the scene information from the area image DB 73 based on the scene information from the scene determination unit 32, and supplies the area image to the similarity calculation unit 75.

In step S54, the similarity calculation unit 75 compares the input image from the area division unit 72 to the area image from the area image selection unit 74 and calculates a shape similarity which is one of the similarities between the input image and the area image. The shape similarity indicates a similar degree between the shape of the color area of the input image and the shape of the color area of the area image corresponding to the scene information.

For example, when an image obtained by photographing the horizon at sunset on a clear day is input as the input image, as shown in the left side of FIG. 9, an input image $I_i$ is divided into a color area $R_{i1}$ corresponding to a sky turned orange at sunset and a color area $R_{i2}$ corresponding to the sea turned brown due to the influence of the sunset by the area division unit 72. In the input image $I_i$ of FIG. 9, the horizon (boundary between the color area $R_{i1}$ and the color area $R_{i2}$) is located so as to divide the input image $I_i$ into upper and lower parts substantially equally.

When the input image $I_i$ is input into the image processing apparatus 11, as described with reference to FIG. 9, the scene determination unit 32 supplies the scene information indicating "the sea" to the area image selection unit 74. The area image selection unit 74 reads the plurality of area images of which the scene is "the sea" from the area image DB 73. The read area image is the area image $I_j$ with a so-called horizontal composition, for example, as shown in the right side of FIG. 9. The area image $I_j$ includes a color area $R_{j1}$ and a color area $R_{j2}$. The boundary between the color area $R_{j1}$ and the color area $R_{j2}$ is located at the position which is ⅓ of the area image $I_j$ from the lower side.

In the example of FIG. 9, even when the images of which the scene is "the sea" have the same composition, the images include not only the images, such as the input image $I_j$, with the scene of the sunset but also include the images with a daylight band formed by a blue sky and the sea. Therefore, a plurality of the area images $I_j$ is prepared according to the combinations of the colors of the color area $R_{j1}$ and the color area $R_{j2}$.

In this case, in step S54, the similarity calculation unit 75 calculates the similarity (shape similarity) between the shape of the color area $R_{i1}$ and the color area $R_{i2}$ of the input image $I_i$ and the shape of the color area $R_{j1}$ and the color area $R_{j2}$ of the area image $I_j$. Specifically, for example, a shape similarity $Sim_S(I_i, I_j)$ expressed by Expression (1) below is calculated by a similarity calculation method in which the size of an area is added to the Jaccard coefficient, which is disclosed in "Similarity for Composition-Based Similar Image Retrieval, YAMAMOTO Atsushi, et al., Journal of Information Processing Society, Database, vol. 48 (SIG_14(TOD_35)), pp. 82 to 90, 2007".

[Expression 1]

$$sim_s(I_i, I_j) = \frac{1}{|I_1|} \sum_{R_{ip} \in I_i} \sum_{R_{jq} \in I_j} \frac{|R_{ip} \cap R_{jq}|^2}{|R_{ip} \cup R_{jq}|} \quad (1)$$

In Expression (1), p and q are values specifying the color areas of each of the input image $I_i$ and the area image $I_j$. In the example of FIG. 9, values 1 and 2 are taken, respectively.

Of course, the similarity calculation unit 75 may calculate the shape similarity according to another method.

In step S55, the similarity calculation unit 75 compares the input image from the area division unit 72 to the area image from the area image selection unit 74, and calculates a color similarity which is one of the similarities between the input image and the area image. In addition, the color similarity indicates a similar degree between the color information of the color area of the input image and the color information of the color area of the area image corresponding to the scene information.

Specifically, for example, the similarity calculation unit 75 calculates the color similarity $sim_C(I_i, I_j)$ expressed in Expression (2) below.

[Expression 2]

$$sim_C(I_i, I_j) = 1 - \sum_{R_{ip} \in I_i} \sum_{R_{jq} \in I_j} \frac{|h(R_{ip}) - h(R_{jq})|}{|h(R_{ip}) + h(R_{jq})|} \cdot \delta_{pq} \quad (2)$$

In Expression (2), $h(R_{ip})$ and $h(R_{jq})$ indicate the averages of hues of the pixels in the color areas of the input image $I_i$ and the area image $I_j$, respectively. In addition, $\delta_{pq}$ the so-called Kronecker delta expressed in Expression (3) below.

[Expression 3]

$$\delta_{pq} = \begin{cases} 1 & (p = q) \\ 0 & (p \neq q) \end{cases} \quad (3)$$

In Expression (2), the second term indicates an average of color differences for all color areas where the color areas of the input image $I_i$ and the color areas of the area image $I_j$ accord with each other. That is, as the colors of the respective areas (the color area $R_{i1}$ and the color area $R_{j1}$, and the color area $R_{i2}$ and the color area $R_{j2}$ in FIG. 9) in the input image $I_i$ and the area image $I_j$ are similar to each other, the value of the second term in Expression (2) becomes smaller and the color similarity $sim_C(I_i, I_j)$ becomes larger.

Based on the shape similarity and the color similarity calculated for the plurality of area images corresponding to the scene information, the similarity calculation unit 75 supplies, for example, the area image with the largest color similarity as a reference area image, among the area images with the shape similarity larger than a predetermined value to the evaluation result output unit 24. The similarity calculation unit 75 supplies the similarity (the shape similarity and the color similarity) between the input image and the reference area image to the composition evaluation unit 23, and then the process returns to step S34 in the flowchart of FIG. 7.

The similarity calculation unit 75 may set, for example, the area image with the largest color similarity as the reference area image, among the area images with the same number of divided color areas and may set the shape similarity and the color similarity between the input image and the reference area image as the respective similarities.

Figure 6:
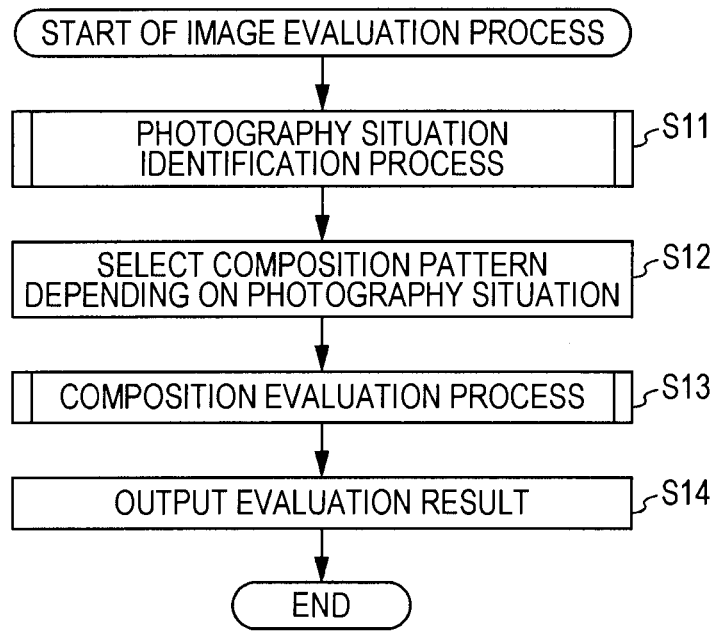
FIG. 6 is a flowchart illustrating an image evaluation process of the image processing apparatus in FIG. 1.
Figure 7:
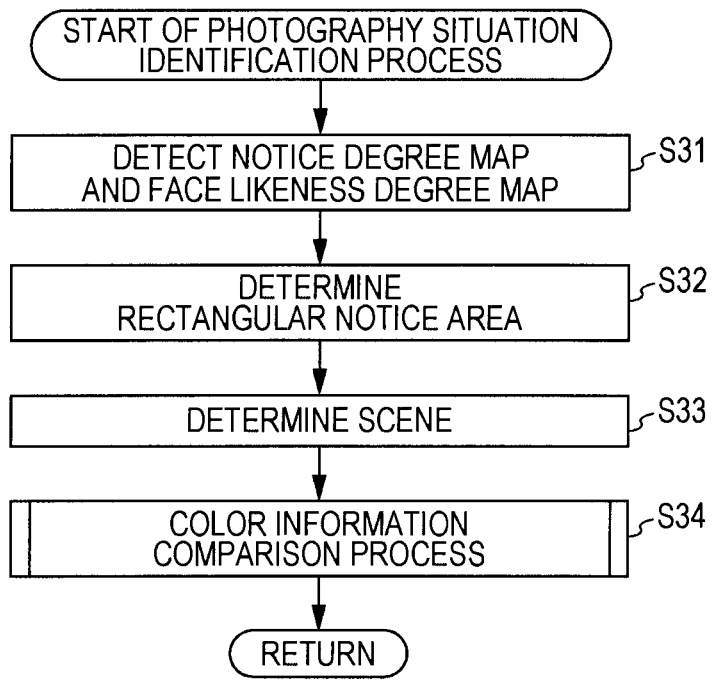
FIG. 7 is a flowchart illustrating a photography situation identification process.
Figure 8:
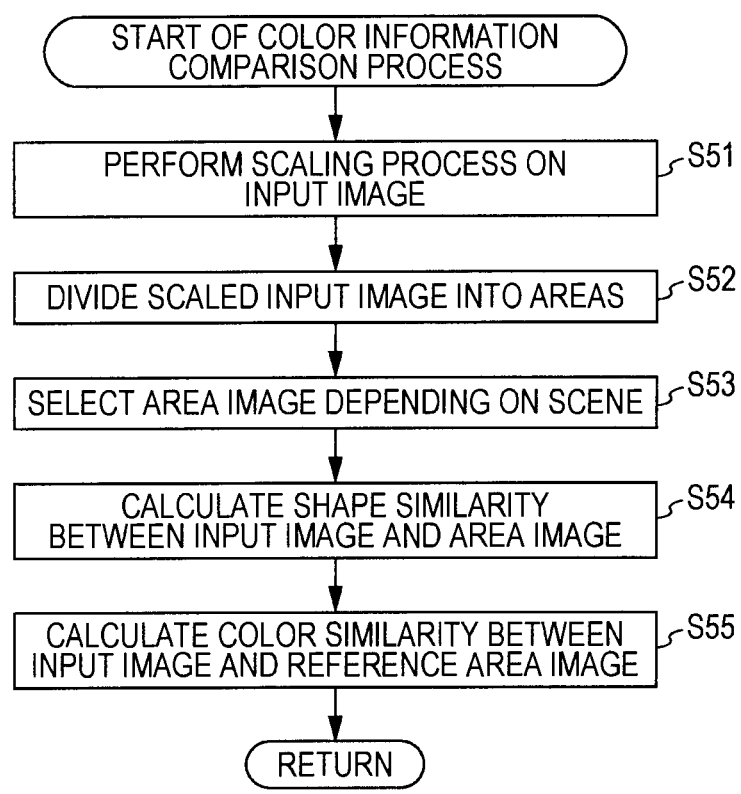
FIG. 8 is a flowchart illustrating a color information comparison process.

Referring back to the flowchart of FIG. 7, the process returns to step S11 in the flowchart of FIG. 6 after step S34.

Referring back to the flowchart of FIG. 6, the process proceeds to step S12 after step S11. Then, the composition pattern selection unit 22 selects the composition pattern to be applied (recommended) to the input image based on the number of notice area information from the notice area extraction unit 31 and the scene information from the scene determination unit 32, and supplies the composition pattern to the composition evaluation unit 23 and the evaluation result output unit 24.

Hereinafter, the composition pattern selected based on the number of notice areas (subjects) and the scene will be described with reference to FIG. 10.

In FIG. 10, various composition patterns are determined in correspondence with the number of notice areas (subjects) and the respective scenes such as "seashore", "rural scenery", "sky", "mountain", "highway", "street", "downtown", and "skyscraper".

In FIG. 10, for example, when the number of notice areas is 0 in the input image with the scene of "seashore" (that is, only seashore scene is shown), the horizontal composition is selected as the composition pattern. When the number of notice areas is 1, a 3-division composition and the horizontal composition are selected as the composition pattern. When the number of notice areas is 2 to 5, a contrast composition and the horizontal composition are selected as the composition pattern. When the number of notice areas is 6 or more, the contrast composition and the horizontal composition are selected as the composition pattern.

When the number of notice areas is 0 in the input image with the scene of "rural scenery" (that is, only rural scenery is shown), a radial composition is selected as the composition pattern. When the number of notice areas is 1, a 3-division composition and the radial composition are selected as the composition pattern. When the number of notice areas is 2 to 5, a contrast composition and the radial composition are selected as the composition pattern. When the number of notice areas is 6 or more, the radial composition and a pattern composition are selected as the composition pattern.

Likewise, the composition pattern is selected in correspondence with the number of notice areas in the input image with the scene of "sky", the input image with the scene of "mountain", the input image with the scene of "highway", and so on.

When two composition patterns are selected, the composition pattern satisfying each composition is supplied to the composition evaluation unit 23 and the evaluation result output unit 24.

Hereinafter, a case where the number of notice areas in the input image is 1 and the 3-division composition is set as the composition pattern of the input image will be described.

Referring back to the flowchart of FIG. 6, in step S13, the composition evaluation unit 23 performs the composition evaluation process based on the photography situation information from the photography situation identification unit 21 and the composition pattern from the composition pattern selection unit 22, and scores the composition of the input image input to the image processing apparatus 11.

Composition Evaluation Process of Composition Evaluation Unit

Hereinafter, the composition evaluation process of step S13 in the flowchart of FIG. 6 will be described with reference to the flowchart of FIG. 11.

In step S71, the layout evaluation unit 111 of the composition evaluation unit 23 performs the layout evaluation process based on the composition pattern from the composition pattern selection unit 22 and the position and the size of the notice area expressed by the notice area information from the notice area extraction unit 31.

Layout Evaluation Process of Layout Evaluation Unit

Hereinafter, the layout evaluation process of step S71 in the flowchart of FIG. 11 will be described with reference to the flowchart of FIG. 12.

In step S111, the layout evaluation unit 111 calculates an aspect ratio of the notice area (hereinafter, arbitrarily referred to as a main subject area) based on the size of the notice area expressed by the notice area information from the notice area extraction unit 31.

In step S112, the layout evaluation unit 111 calculates the distances between the reference positions determined depending on the aspect ratio of the main subject area and the central position of the main subject area. Here, the reference positions are lines (horizontal 3-division line) $L_{Dh}$ horizontally dividing the 3-division composition into three parts in the horizontal direction, lines (vertical 3-division lines) $L_{Dv}$ vertically dividing the 3-division composition into three parts in the vertical direction, and intersection points (3-division-line intersection points) $P_D$ between the horizontal 3-division lines and the vertical 3-division lines. That is, when the central position of the main subject area is assumed to be $P_M$, the layout evaluation unit 111 calculates distances $|L_{Dh}-P_M|$, $|L_{Dv}-P_M|$, and $|P_D-P_M|$.

In step S113, the layout evaluation unit 111 calculates values $G_{DLhM}$, $G_{DLvM}$ and $G_{DPM}$ expressed in Expression (4) below based on the distances between the reference positions and the central position of the main subject area.

[Expression 4]

$$G_{DLhM} = \exp\left(-\frac{\min\|L_{Dh} - P_M\|}{d}\right)$$
$$G_{DLvM} = \exp\left(-\frac{\min\|L_{Dv} - P_M\|}{d}\right) \quad (4)$$
$$G_{DPM} = \exp\left(-\frac{\min\|P_D - P_M\|}{d}\right)$$

Expression (4), d indicates the length of a diagonal line of the input image. The values $G_{DLhM}$, $G_{DLvM}$, and $G_{DPM}$ in Expression (4) become larger as the central position of the main subject area gets closer to the horizontal 3-division line, the vertical '3-division line, and the 3-division line intersection point, respectively.

In step S114, the layout evaluation unit 111 calculates coefficients $\alpha_{hM}$, $\alpha_{vM}$, and $\alpha_{pM}$ for the shape of the notice area based on the aspect ratio of the main subject area.

The coefficients $\alpha_{hM}$, $\alpha_{vM}$, and $\alpha_{pM}$ are parameters which are varied depending on an aspect ratio sal_aspect_ratio$_M$ of the main subject area given in Expression (5) below on the assumption that the width and the height of the main subject area are sal_width$_M$ and sal_height$_M$, respectively, as shown in the upper drawing and the lower drawing of FIG. 13. In the upper drawing and the lower drawing of FIG. 13, the horizontal axis represents the aspect ratio sal_aspect_ratio$_M$ and the vertical axis represents values of the coefficients $\alpha_{hM}$, $\alpha_{vM}$, and $\alpha_{pM}$.

[Expression 5]

sal_aspect_ratio$_M$=sal_width$_M$/sal_height$_M$ (5)

Figure 13:
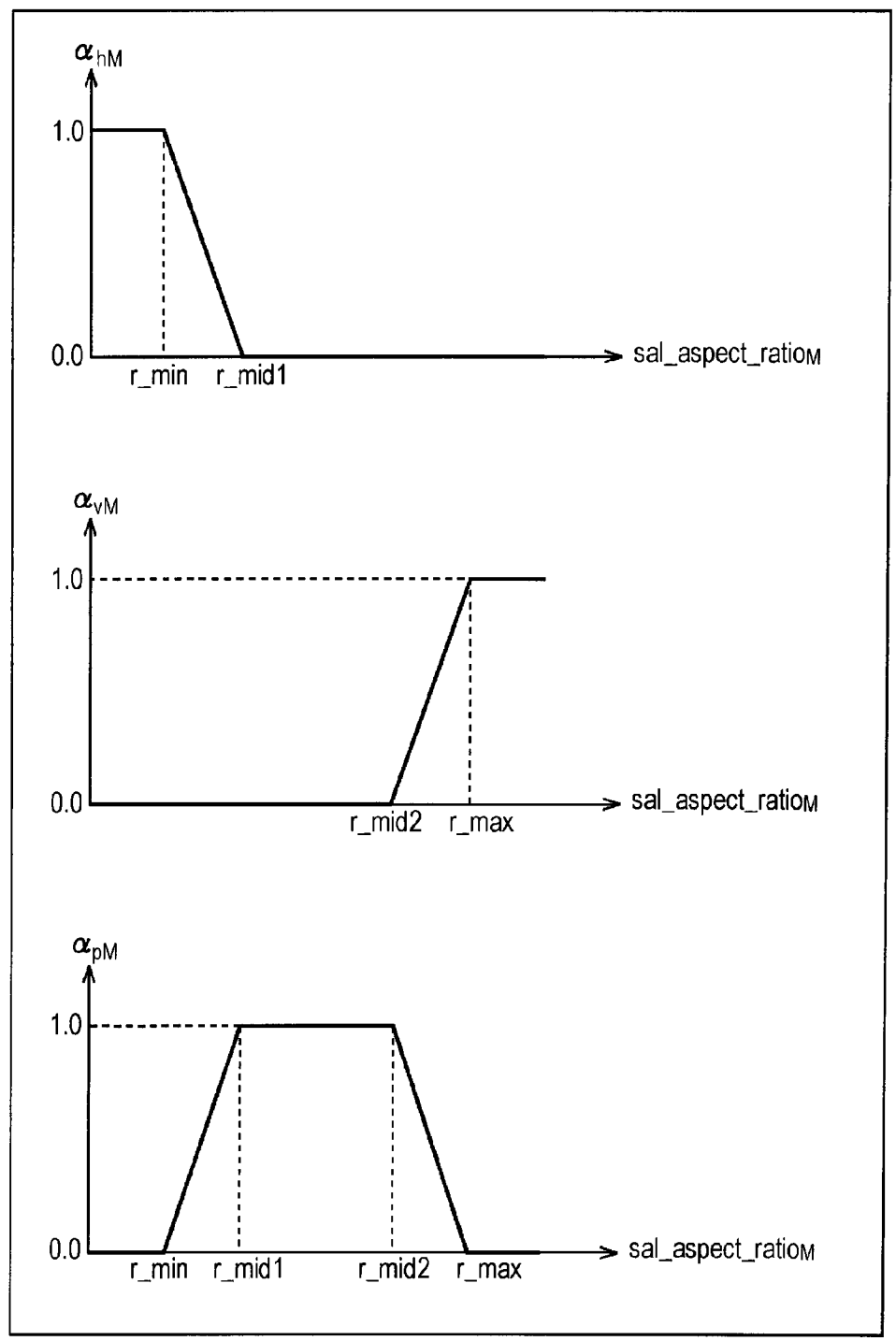
FIG. 13 is a diagram illustrating coefficients used in the layout evaluation process.

In the upper drawing of FIG. 13, the coefficient $\alpha_{hM}$ becomes 1.0 when the aspect ratio sal_aspect_ratio$_M$ is in the range from 0 to r_min. The coefficient $\alpha_{hM}$ becomes 0.0 when the aspect ratio sal_aspect_ratio$_M$ is larger than r_mid1. In addition, when the aspect ratio sal_aspect_ratio$_M$ is in the range from r_min to r_mid1, the coefficient $\alpha_{hM}$ decreases with an increase in the aspect ratio sal_aspect_ratio$_M$. That is, when the main subject area is vertically long, the coefficient $\alpha_{hM}$ is effective.

In the middle drawing of FIG. 13, the coefficient $\alpha_{vM}$ becomes 0.0 when the aspect ratio sal_aspect_ratio$_M$ is in the range from 0 to r_mid2. The coefficient $\alpha_{vM}$ becomes 1.0 when the aspect ratio sal_aspect_ratio$_M$ is larger than r_max.

In addition, when the aspect ratio sal_aspect_ratio$_M$ is in the range from r_min2 to r_max, the coefficient α$_{vM}$ increases with an increase in the aspect ratio sal_aspect_ratio$_M$. That is, when the main subject area is horizontally long, the coefficient α$_{vM}$ is effective.

In the lower drawing of FIG. 13, the coefficient α$_{pM}$ becomes 0.0 when the aspect ratio sal_aspect_ratio$_M$ is in the range from 0 to r_mid or larger than r_max. The coefficient α$_{pM}$ becomes 1.0 when the aspect ratio sal_aspect_ratio$_M$ is in the range from r_mid1 to r_mid2. In addition, when the aspect ratio sal_aspect_ratio$_M$ is in the range from r_min to r_mid1, the coefficient α$_{pM}$ increases with an increase in the aspect ratio sal_aspect_ratio$_M$. When the aspect ratio sal_aspect_ratio$_M$ is in the range from r_min2 to r_max, the coefficient α$_{pM}$ decreases with an increase in the aspect ratio sal_aspect_ratio$_M$. That is, when the main subject area is nearly square, the coefficient α$_{pM}$ is effective.

In step S115, based on the values $G_{DLhM}$, $G_{DLvM}$, and $G_{DPM}$, the coefficients α$_{hM}$, α$_{vM}$, and α$_{pM}$, and a weight coefficient w$_{Msize}$ determined depending on the size of the main subject area, the layout evaluation unit 111 calculates a layout element elem_p indicating the evaluation result of the layout of the main subject area when the composition pattern is applied to the input image.

First, an evaluation function E(M) for evaluating the layout of the main subject area in the input image is calculated, as expressed in Expression (6) below. In this expression, M indicates that the evaluation function E is an evaluation function for the main subject area.

[Expression 6]

$$E(M) = \alpha_{hM} \cdot G_{DLhM} + \alpha_{vM} \cdot G_{DLvM} + \alpha_{PM} \cdot G_{DPM} \quad (6)$$

Figure 14:
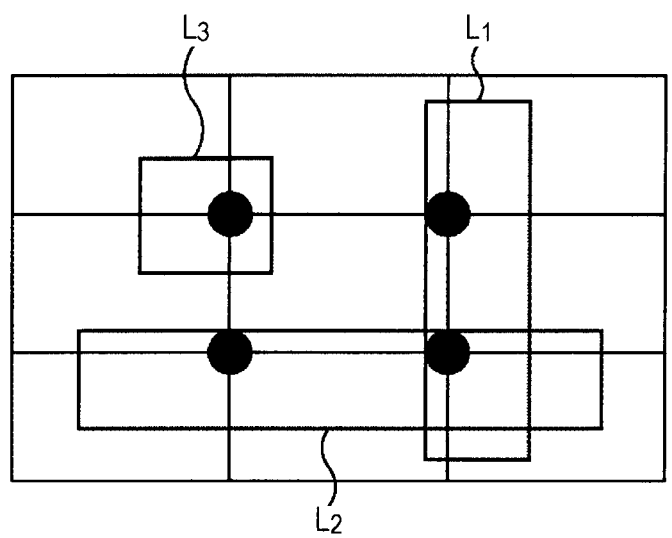
FIG. 14 is a diagram illustrating the value of an evaluation function by the shape of the main subject area.

In Expression (6), as shown in FIG. 14, the value of the evaluation function E(M) increases, as area $L_1$ where the main subject area is vertically long, area $L_2$ where the main subject area is horizontally long, and area $L_3$ where the main subject area is nearly square gets closer to the horizontal 3-division line, the vertical 3-division line, and the 3-division line intersection point, respectively.

Based on the evaluation function E(M) and the weight coefficient w$_{Msize}$ the layout element elem_p shown in Expression (7) below is calculated.

[Expression 7]

$$elem\_p = E(M) \cdot w_{Msize} \quad (7)$$

Figure 15:
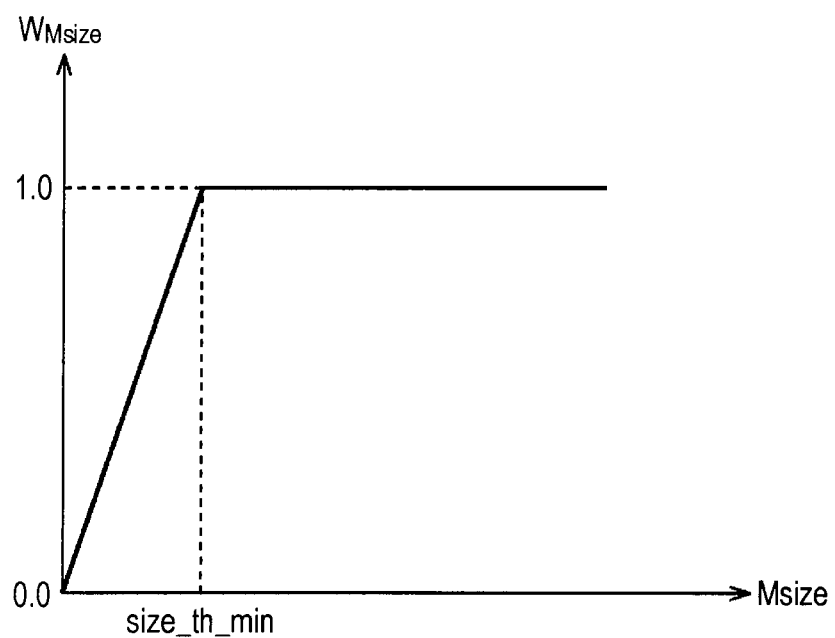
FIG. 15 is a diagram illustrating a weight coefficient determined depending on the size of the main subject area.

The weight coefficient w$_{Msize}$ is a parameter which is varied depending on the size Msize of the main subject area, as shown in FIG. 15. In FIG. 15, the horizontal axis represents the size Msize of the main subject area and the vertical axis represents the value of weight coefficient WM$_{Msize}$.

In FIG. 15, when the size Msize is larger than size_th_min, the weight coefficient w$_{Msize}$ is 1.0. When the size Msize is in the range from 0 to size_th_min, the weight coefficient w$_{Msize}$ increases with an increase in the size Msize. That is, when the size of the main subject area is equal to or smaller than the predetermined size size_th_min, the weight of the weight coefficient w$_{Msize}$ increases depending on the size of the main subject area.

Thus, the layout element elem_p is calculated which has a value increasing as the vertically long main subject area, the horizontally long main subject area, and the nearly square main subject area get closer to the horizontal 3-division line, the vertical 3-division line, and the 3-division line intersection point, respectively. The calculated layout element elem_p is supplied to the score calculation unit 114.

Figure 11:
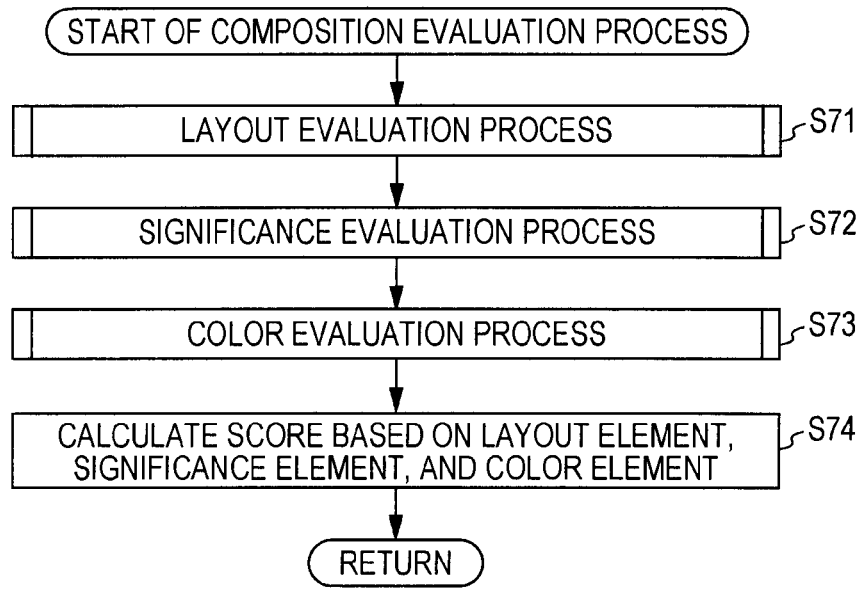
FIG. 11 is a flowchart illustrating a composition evaluation process.
Figure 12:
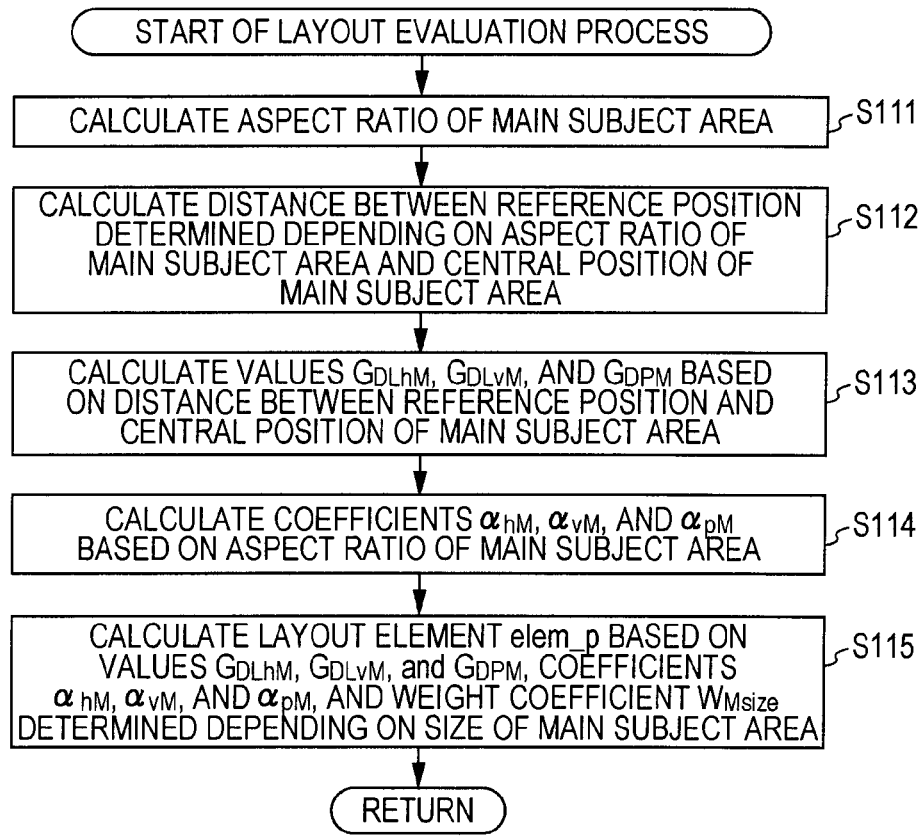
FIG. 12 is a flowchart illustrating a layout evaluation process.

Referring back to the flowchart of FIG. 11, in step S72, the significance evaluation unit 112 performs a significance evaluation process to evaluate the significance of the notice area in the input image, based on the notice degree (or the face likeness degree) of the notice area expressed by the notice area information from the notice area extraction unit 31.

Significance Evaluation Process of Significance Evaluation Unit

Figure 16:
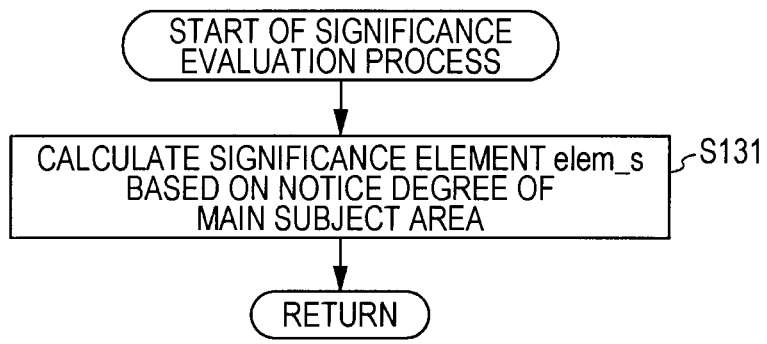
FIG. 16 is a flowchart illustrating a significance evaluation process.

Hereinafter, the significance evaluation process of step S72 in the flowchart of FIG. 11 will be described with reference to the flowchart of FIG. 16.

In step S131, the significance evaluation unit 112 calculates an significance element elem_s, which is expressed in Expression (8) below and indicates the evaluation result of the significance of the main subject area when the composition pattern is applied to the input image, using a notice degree (or the face likeness degree) sal$_M$ of the notice area expressed by the notice area information from the notice area extraction unit 31.

[Expression 8]

$$elem\_s = sal_M \quad (8)$$

Thus, the significance element elem_s is calculated which has a value increasing as the notice degree (or the face likeness degree) of the main subject area gets larger. In addition, the significance element elem_s is not limited to the value calculated by Expression (8) above, but may be calculated according to another method. The calculated significance element elem_s is supplied to the score calculation unit 114.

Referring back to the flowchart of FIG. 11, in step S73, the color evaluation unit 113 performs a color evaluation process to evaluate how much the color (color information) of the input image is suitable for the scene determined by the scene determination unit 32, based on the similarity from the color information comparison unit 33.

Color Evaluation Process of Color Evaluation Unit

Figure 17:
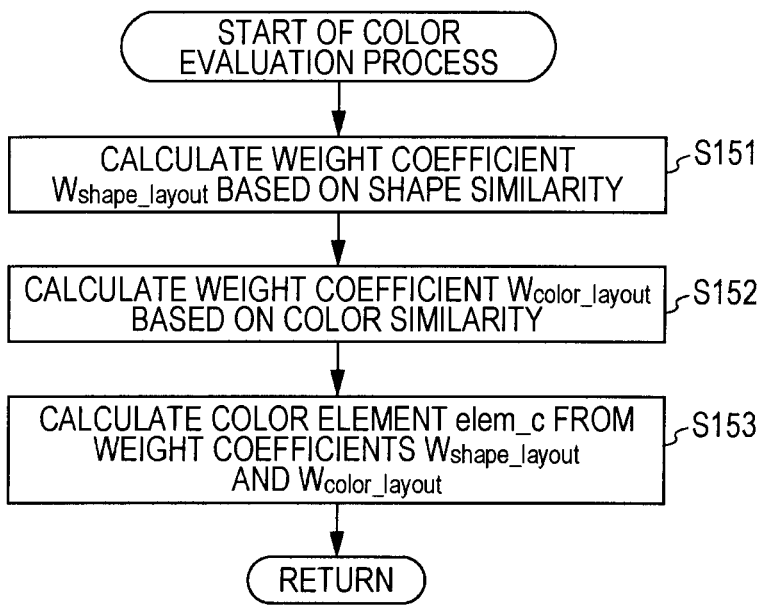
FIG. 17 is a flowchart illustrating a color evaluation process.

Hereinafter, the color evaluation process of step S73 in the flowchart of FIG. 11 will be described with reference to the flowchart of FIG. 17.

In step S151, the color evaluation unit 113 calculates a weight coefficient w$_{shape\_layout}$ based on the shape similarity from the color information comparison unit 33.

Figure 18:
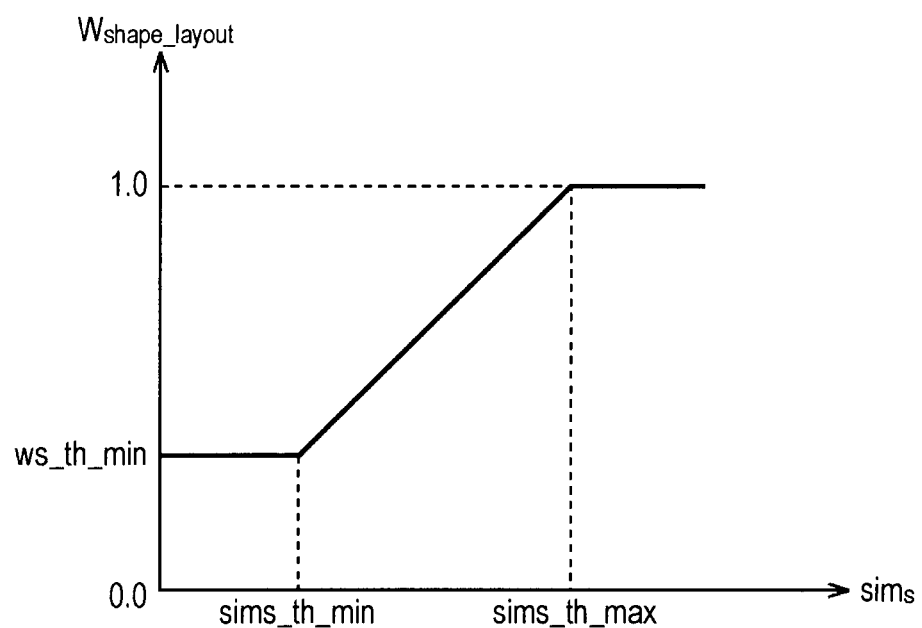
FIG. 18 is a diagram illustrating a weight coefficient determined depending on a shape similarity.

The weight coefficient w$_{shape\_layout}$ is a parameter which, is varied depending on the shape similarity sim$_S$ from the color information comparison unit 33, as shown in FIG. 18. In FIG. 18, the horizontal axis represents the shape similarity sim$_S$ and the vertical axis represents the value of weight coefficient w$_{shape\_layout}$.

In FIG. 18, when the shape similarity sim$_S$ is smaller than sims_th_min, the weight coefficient w$_{shape\_layout}$ is ws_th_min. When the shape similarity sim$_S$ is larger than sims_th_max, the weight coefficient w$_{shape\_layout}$ is 1.0. When the shape similarity sim$_S$ is in the range from sims_th_min to sims_th_max, the weight coefficient w$_{shape\_layout}$ increases with an increase in the shape similarity sim$_S$. That is, as the shape similarity sim$_S$ gets larger, the weight of the weight coefficient w$_{shape\_layout}$ increases.

In step S152, the color evaluation unit 113 calculates a weight coefficient w$_{color\_layout}$ based on the color similarity from the color information comparison unit 33.

Figure 19:
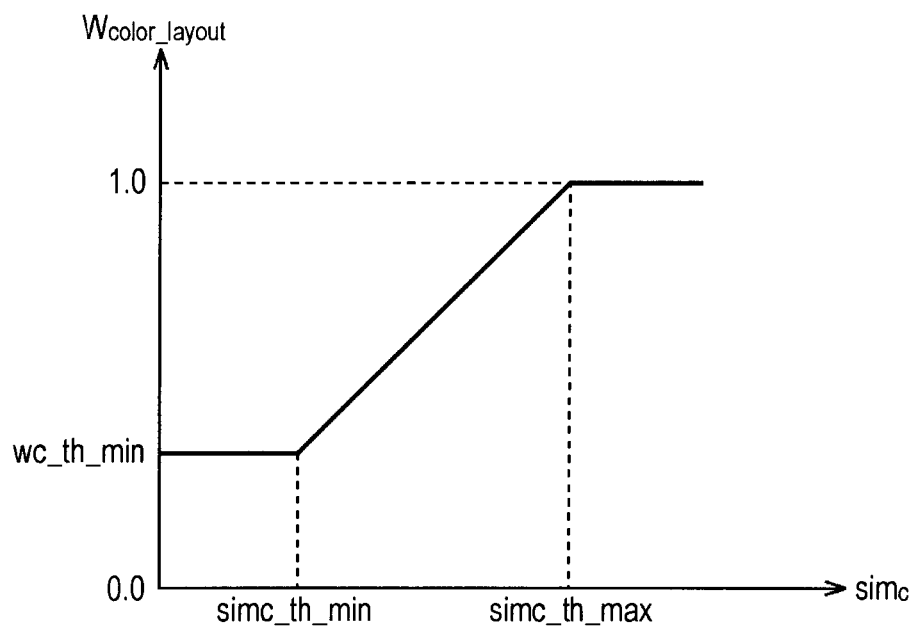
FIG. 19 is a diagram illustrating a weight coefficient determined depending on a color similarity.

The weight coefficient w$_{color\_layout}$ is a parameter which is varied depending on the color similarity sim$_C$ from the color information comparison unit 33, as shown in FIG. 19. In FIG. 19, the horizontal axis represents the color similarity sim$_C$ and the vertical axis represents the value of weight coefficient w$_{color\_layout}$.

In FIG. 19, when the color similarity sim$_C$ is smaller than simc_th_min, the weight coefficient w$_{color\_layout}$ is wc_th_min. When the color similarity sim$_C$ is larger than simc_ th_max, the weight coefficient $w_{color\_layout}$ is 1.0. When the color similarity $sim_C$ is in the range from simc_th_min to simc_th_max, the weight coefficient $w_{color\_layout}$ increases with an increase in the color similarity $sim_C$. That is, as the color similarity $sim_C$ is larger, the weight of the weight.coefficient $w_{color\_layout}$ increases.

In step S153, the color evaluation unit 113 calculates a color element elem_c, which is expressed in Expression (9) below and indicates the evaluation result of the suitability of the color of the input image with the scene of the input image, from the weight coefficients $w_{shape\_layout}$ and $w_{color\_layout}$.

[Expression 9]

$$\text{elem}\_c = w_{shape\_layout} \cdot w_{color\_layout} \quad (9)$$

Thus, the color element elem_c is calculated which has a value increasing as the shape similarity and the color similarity between the input image and the reference image get larger. The color element elem_c is not limited to the value calculated by Expression (9) above, but may be calculated according to another method. The calculated color element elem_c is supplied to the score calculation unit 114.

Referring back to the flowchart of FIG. 11, in step S74, the score calculation unit 114 calculates a score as the evaluation result of the composition of the input image based on the layout element elem_p from the layout evaluation unit 111, the significance element elem_s from the significance evaluation unit 112, and the color element elem_c from the color evaluation unit 113, and supplies the score to the evaluation result output unit 24.

Specifically, the score calculation unit 114 calculates the score Score expressed in Expression (10) below by weighting and adding the layout element elem_p, the significance element elem_s, and the color element elem_c.

[Expression 10]

$$\text{Score} = \alpha \cdot \text{elem}\_p + \beta \cdot \text{elem}\_s + \gamma \cdot \text{elem}\_c \quad (10)$$

In Expression (10), coefficients $\alpha$, $\beta$, and $\gamma$ are weight coefficients for the layout element elem_p, the significance element elem_s, and the color element elem_c, respectively, and have a relationship of Expression (11) below.

[Expression 11]

$$\alpha + \beta + \gamma = 100 \quad (11)$$

Specifically, the relationship of $\alpha=40$, $\beta=20$, and $\gamma=40$ is exemplified. Here, by normalizing the layout element elem_p, the significance element elem_s, and the color element elem_c so as to have a value with the range from 0 to 1, the score Score expressed in Expression (10) has a value with the range from 0 to 100. When the coefficients $\alpha$, $\beta$, and $\gamma$ have a relationship of $\alpha=100$, $\beta=0$, and $\gamma=0$, the score Score obtains an evaluation result noticing only the layout of the notice area. When the coefficients $\alpha$, $\beta$, and $\gamma$ have a relationship of $\alpha=0$, $\beta=0$, and $\gamma=100$, the score Score obtains an evaluation result noticing only the color of the input image.

Thus, the evaluation result (score) for the composition of the input image is calculated from the evaluation result for the layout and the significance of the main subject area in the input image and the evaluation result of the suitability between the color and the scene of the input image. The calculated score is supplied to the evaluation result output unit 24.

Referring back to the flowchart of FIG. 6, in step S14, the evaluation result output unit 24 outputs the score Score from the composition evaluation unit 23, the scene information from the scene determination unit 32, the reference area image from the color information comparison unit 33, and the composition pattern from the composition pattern selection unit 22 together with the input image, as an output image, to a display apparatus or the like (not shown).

Figure 20:
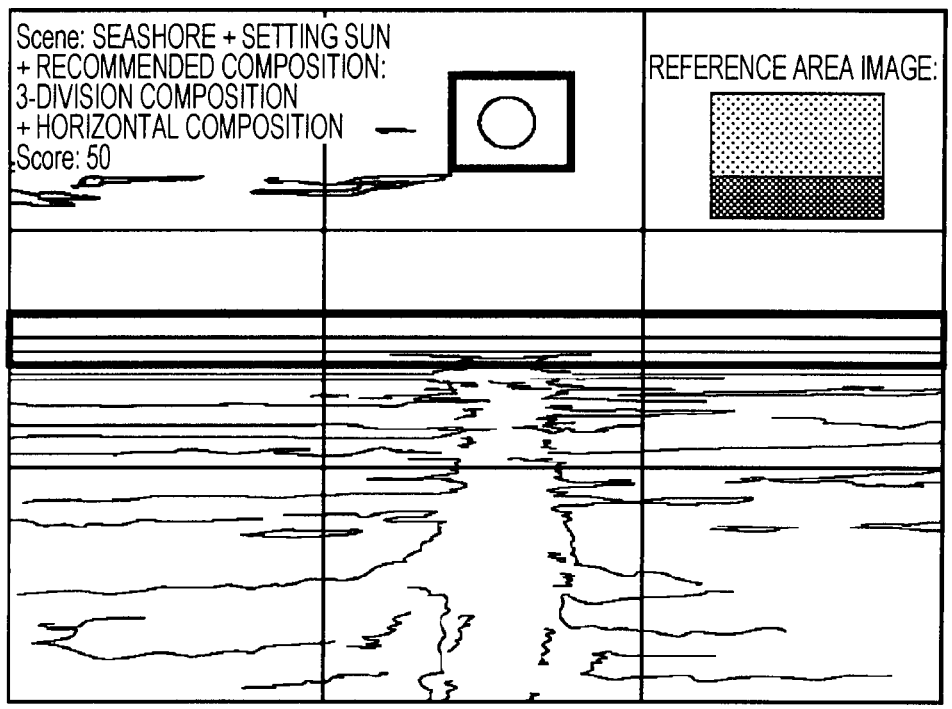
FIG. 20 is a diagram illustrating an example of an output image.

FIG. 20 is a diagram illustrating an example of the output image output on the display apparatus (not shown).

In FIG. 20, a reduced image indicating the scene information, the composition pattern, the score, and the reference area image on the input image obtained by photographing the sun setting on the horizon at sunset of a clear day is displayed on an OSD (On Screen Display).

Specifically, the character lines "scene: seashore+setting sun" as the scene information, "recommended composition: 3-division composition+horizontal composition" as the composition pattern, and "Score: 50" as the score are displayed on the upper left side of the input image. In addition, a reduced image indicating the character line of "reference area image" and the reference area image are displayed on the upper right side of the input image.

In FIG. 20, the sun as a subject and the horizon determining the color area are surrounded by a rectangular shape and are displayed. The 3-division lines indicating the 3-division composition are displayed on the entire input image.

By the above-described process, the 3-division composition is selected as the composition pattern depending on the photography situation of the input image, the composition of the input image is evaluated based on the photography situation and the composition pattern, and the score is output as the evaluation result. Thus, a user can compare the input image input from the imaging apparatus to the composition recommended on the input image, and can also confirm the evaluation result as the evaluation result for the composition of the input image, based on the composition recommended on the input image with ease.

The image evaluation process has hitherto been described when the number of notice areas (main subject areas) in the input image is 1 and the 3-division composition is selected as the composition pattern of the input image. Hereinafter, a process will be described when the number of notice areas in the input image is 2 and the contrast composition is selected as the composition pattern of the input image.

2. Second Embodiment

In the image evaluation process when the number of notice areas in the input image is 2 and the contrast composition is selected as the composition pattern of the input image, the processes other than the layout evaluation process and the significance evaluation process are the same as those described above. Therefore, the description will be omitted.

Hereinafter, when the number of notice areas is 2 in the input image, for example, the notice area with the larger notice degree between the two notice areas is set to a main subject area and the notice area with the smaller notice degree is set to a sub subject area.

Layout Evaluation Process When Contrast Composition Is Selected

Figure 21:
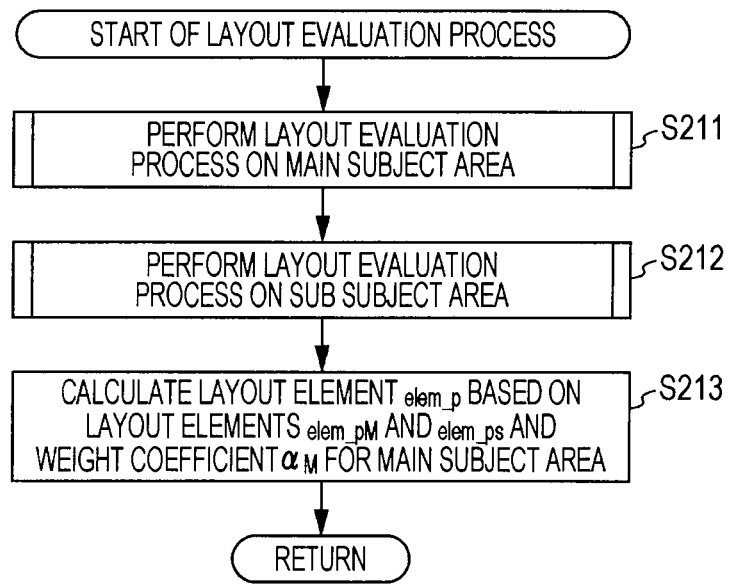
FIG. 21 is a flowchart illustrating a layout evaluation process.

First, a layout evaluation process when the contrast composition is selected will be described with reference to the flowchart of FIG. 21.

In step S211, the layout evaluation unit 111 performs the layout evaluation process on the main subject area to calculate the layout element $\text{elem}\_p_M$ for the main subject area. Since the calculated layout element $\text{elem}\_p_M$ is calculated like the layout element elem_p calculated by the layout evaluation process described with reference to the flowchart of FIG. 12, the detailed description is omitted. That is, the layout element $\text{elem}\_p_M$ is calculated as the product $E(M) \cdot w_{Msize}$ of the evaluation function $E(M)$ for the layout of the main subject areas in the input image and the weight coefficient $w_{Msize}$ determined depending on the size of the main subject areas.

In step S212, the layout evaluation unit 111 performs the layout evaluation process on the sub subject area to calculate a layout element elem_$p_S$ for the sub subject area. Since the calculated layout element elem_$p_S$ is also calculated like the layout element elem_p calculated by the layout evaluation process described with reference to the flowchart of FIG. 12, the detailed description is omitted. That is, the layout element elem_$p_S$ is calculated as the product $E(S) \cdot w_{Ssize}$ of an evaluation function E(S) for the layout of the sub subject area in the input image and a weight coefficient $w_{Ssize}$ determined depending on the size of the sub subject area. In addition, S in the evaluation function E(S) and the suffix S of the weight coefficient $w_{Ssize}$ indicate that the evaluation function or the weight function is an evaluation function or a weight function for the sub subject area.

In step S213, the layout evaluation unit 111 calculates the layout element elem_p expressed in Expression (12) below based on the layout element elem_$p_M$ (=$E(M) \cdot w_{Msize}$) for the main subject area, the layout element elem_$p_S$ (=$E(S) \cdot w_{Ssize}$) for the sub subject area, and a weight function $\alpha_M$ for the main subject area.

[Expression 12]

$$\text{elem\_}p = \alpha_M \cdot E(M) \cdot w_{Msize} + (1-\alpha_M) \cdot E(S) \cdot w_{Ssize} \quad (12)$$

In Expression (12), the weight function $\alpha_M$ is set in advance depending on the notice degree of the main subject area in the range of $0 < \alpha_M < 1$. That is, the weight function $\alpha_M$ refers to a parameter for determining how much a subject corresponding to the main subject area is markedly displayed as the subject corresponding to the main subject area and the subject corresponding to the sub subject area in the contrast composition.

Here, the layout element elem_p is an index for evaluating the layout of the main subject area and the sub subject area in the contrast composition. The layout element elem_p has a larger value, as each of the main subject area and the sub subject area approaches the 3-division line or the 3-division line intersection point which is the reference position.

Figure 22:
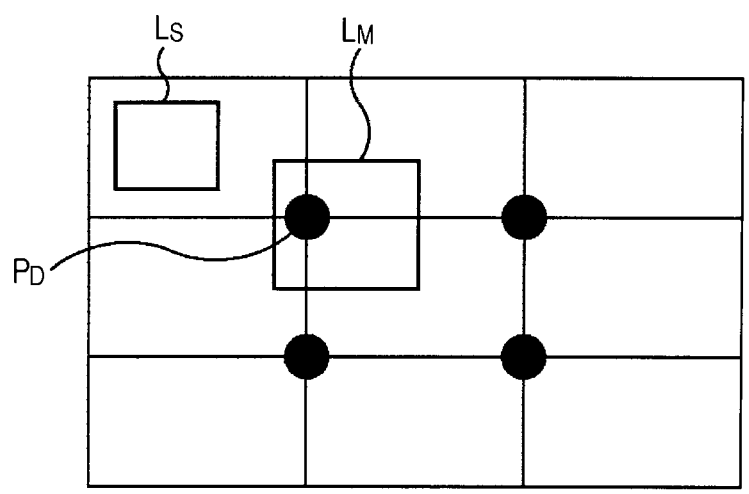
FIG. 22 is a diagram illustrating a contrast composition.

However, when each of the main subject area and the sub subject area approaches the same 3-division line or the same 3-division line intersection point, for example, when each of the main subject area $L_M$ and the sub subject area $L_S$ is close to the 3-division line intersection point $P_D$ on the upper left side of the 3-division composition, as shown in FIG. 22, the layout element elem_p expressed in Expression (12) becomes a large value in spite of the fact that the balance is not good in the contrast composition.

Here, when each of the main subject area and the sub subject area is close to the same 3-division line or the same 3-division line intersection point, the value of the layout element elem_p may be decreased, for example, by multiplying the layout element elem_p by a predetermined coefficient such as 0.5.

Figure 23:
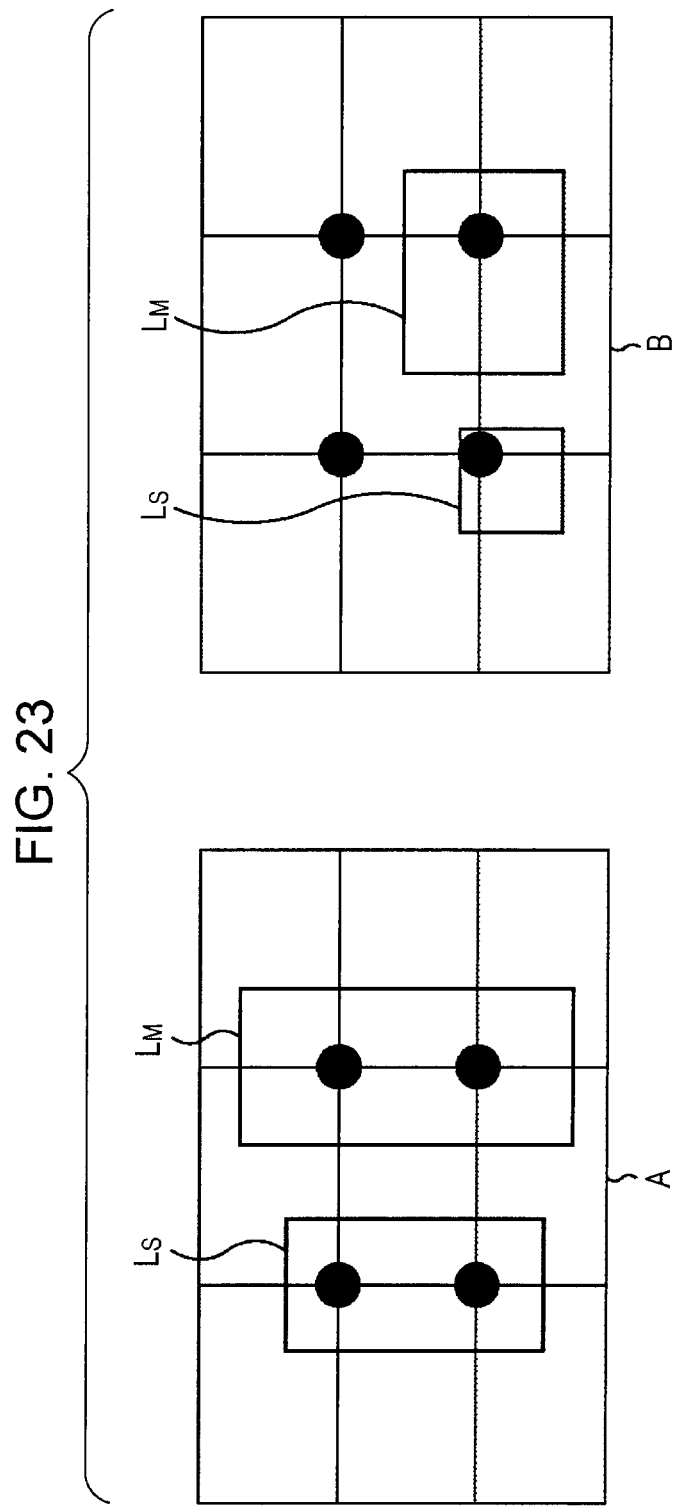
FIG. 23 is a diagram illustrating the contrast composition.

The invention is not limited to the case where each of the main subject area and the sub subject area is close to the same reference position, but a plurality of specific compositions (layout of the main subject areas and the sub subject areas) with a good balance as the contrast composition may be set in advance, as composition A or composition B shown in FIG. 23. In a case of a layout considerably different from this layout, the value of the layout element may be decreased by multiplying the layout element elem_p by a predetermined coefficient even when the main subject area and the sub subject area are each close to the different reference positions.

Thus, the layout element elem_p is calculated when the contrast composition is selected in the case where two notice areas of the main subject area and the sub subject area exist on the 3-division composition in the input image.

Significance Evaluation Process When Contrast Composition is Selected

Figure 24:
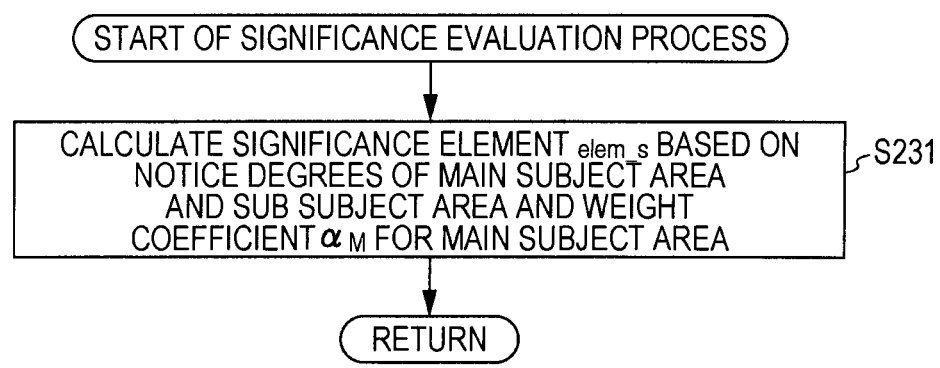
FIG. 24 is a flowchart illustrating a significance evaluation process.

Next, the significance evaluation process when the contrast composition is selected will be described with reference to the flowchart of FIG. 24.

In step S231, the significance evaluation unit 112 calculates the significance element elem_s expressed in Expression (13) below using a notice degree $sal_M$ of the main subject area and a notice degree $sal_S$ of the sub subject area expressed by the notice area information from the notice area extraction unit 31 and the weight function $\alpha_M$ for the main subject area.

[Expression 13]

$$\text{elem\_}s = \alpha_M \cdot sal_M + (1-\alpha_M) \cdot E(S) \cdot sal_S \quad (13)$$

In Expression (13), the weight function $\alpha_M$ is the same as that described in Expression (12).

Thus, the significance element elem_s is calculated such that the value increases as the notice degrees of the main subject area and the sub subject area gets larger. Here, the significance element elem_s is not limited to the value calculated by Expression (13) described above, but may be calculated according to another method.

Even when the number of notice areas is 2 and the contrast composition is selected as the composition pattern of the input image, the composition of the input image is evaluated based on the photography situation and the composition pattern and the score is output as the evaluation result. Thus, a user can compare the input image input from the imaging apparatus to the composition recommended on the input image, and can also confirm the evaluation result as the evaluation result for the composition of the input image, based on the composition recommended on the input image with ease.

The image evaluation process has hitherto been described when the number of notice areas in the input image is 2 and the contrast composition is selected as the composition pattern of the input image. Hereinafter, a process will be described when the number of notice areas in the input image is 2 and the diagonal composition is selected as the composition pattern of the input image.

3. Third Embodiment

In the image evaluation process when the number of notice areas in the input image is 2 and the diagonal composition is selected as the composition pattern of the input image, the processes other than the layout evaluation process are the same as those described above. Therefore, the description will be omitted.

Layout Evaluation Process When Diagonal Composition is Selected

Figure 25:
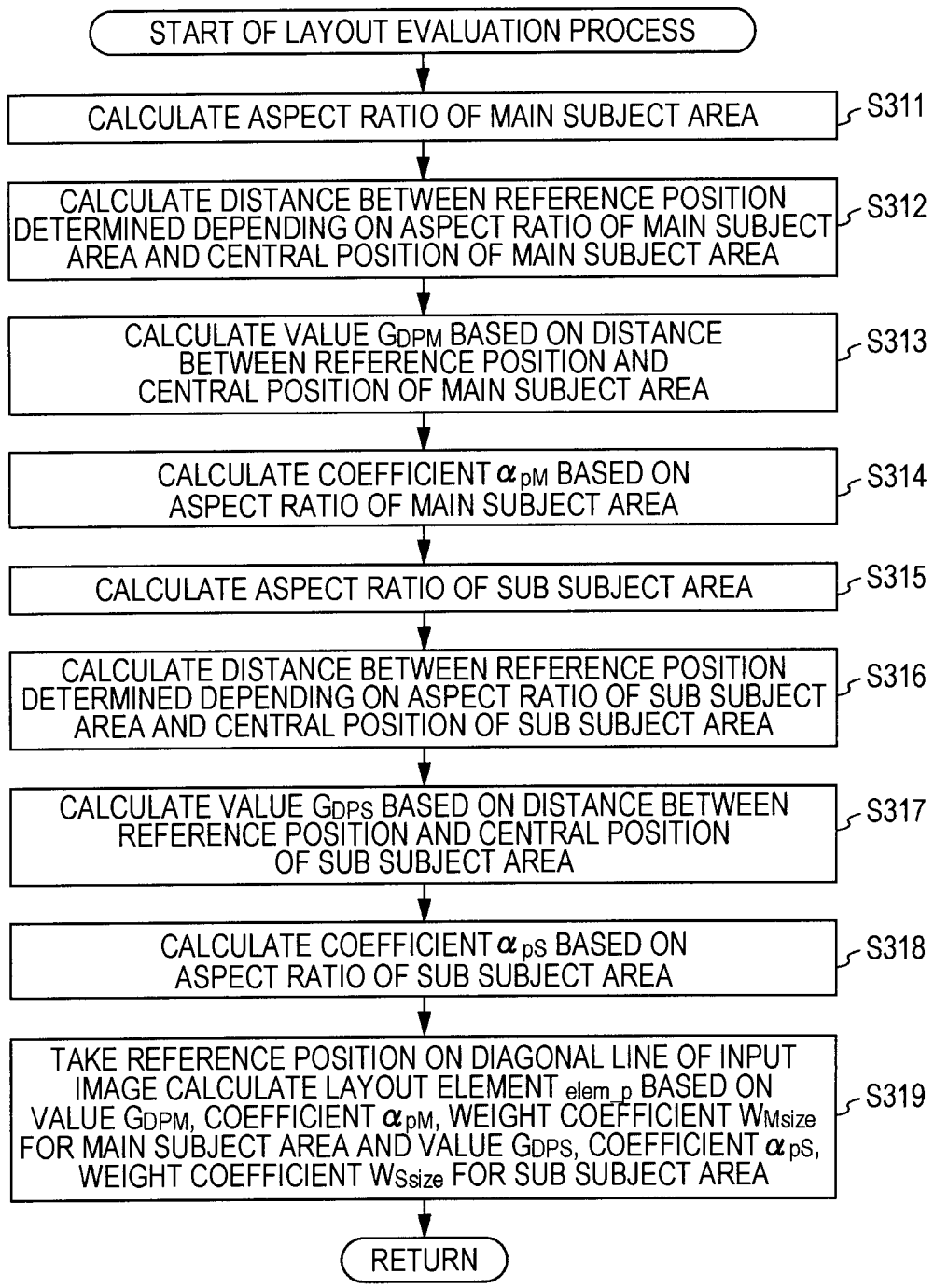
FIG. 25 is a flowchart illustrating a layout evaluation process.

That is, a layout evaluation process when the diagonal composition is selected will be described with reference to the flowchart of FIG. 25.

In step S311, the layout evaluation unit 111 calculates the aspect ratio of the main subject area based on the size of the main subject area in the notice area expressed by the notice area information from the notice area extraction unit 31.

In step S312, the layout evaluation unit 111 calculates the distance between the reference position and the central position of the main subject area according to the aspect ratio of the main subject area.

When the 3-division composition is selected, as described above, the distance between the central position of the main subject area and each of the horizontal 3-division line, the vertical 3-division line, and the 3-division line intersection point is calculated. However, here, only the distance between the central position of the main subject area and the 3-division line intersection point is calculated. That is, the layout evaluation unit 111 calculates the distance $|P_{Di}-P_M|$ between the central position $P_M$ of the main subject area and each of the 3-division line intersection points $P_{Di}$ (where i=0, 1, 2, 3) shown in the FIG. 26.

In step S313, the layout evaluation unit 111 calculates a value $G_{DPM}$ shown in Expression (4) above based on the distance between the central position of the main subject area and each reference position (3-division line intersection point $P_{Di}$).

In step S314, the layout evaluation unit 111 calculates the coefficient $\alpha_{pM}$ for the shape of the main subject area based on the aspect ratio of each main subject area. Here, the coefficient $\alpha_{pM}$ can be calculated like the coefficient $\alpha_{pM}$ described with reference to FIG. 13.

In step S315, the layout evaluation unit 111 calculates the aspect ratio of each sub subject area based on the size of each sub subject area in the notice area expressed by the notice area information from the notice area extraction unit 31.

In step S316, the layout evaluation unit 111 calculates the distance between the central position of each sub subject area and each reference position determined depending on the aspect ratio of each sub subject area.

Figure 26:
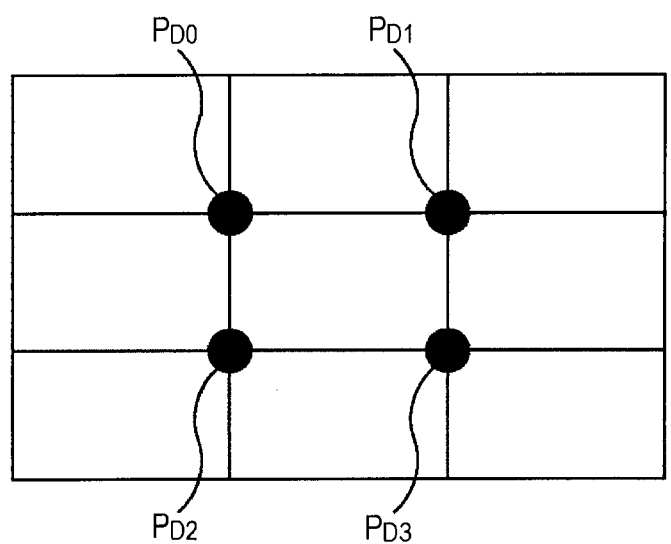
FIG. 26 is a diagram illustrating a diagonal composition.

Here, on the assumption that the central position of the sub subject area is $P_S$, like the process of step S312, the layout evaluation unit 111 calculates a distance $|P_{Di}-P_S|$ between the central position $P_S$ of the sub subject area and each of the 3-division line intersection points $P_{Di}$ shown in FIG. 26.

In step S317, the layout evaluation unit 111 calculates the value $G_{DPM}$ based on the distance between the central position of each sub subject area and each reference position (3-division line intersection point $P_{Di}$), like the value $G_{DPM}$ shown in Expression (4) above.

In step S318, the layout evaluation unit 111 calculates the coefficient $\alpha_{ps}$ for the shape of each sub subject area based on the aspect ratio of each sub subject area. The coefficient $\alpha_{ps}$ can be calculated like the coefficient $\alpha_{pM}$ described with reference to FIG. 13.

Thus, in the diagonal composition, the vertically long notice area (the main subject area and the sub subject area) or the horizontally long notice area is ignored and only the shape of the notice area close to the nearly square shape is noticed.

In step S319, the layout evaluation unit 111 calculates the layout element elem_p based on the value $G_{DPM}$, the coefficient $\alpha_{pM}$, and the weight coefficient $w_{Msize}$ for the main subject area taking the reference positions on the diagonal line of the input image and based on the value $G_{DPS}$, the coefficient $\alpha_{ps}$, and the weight coefficient $w_{Ssize}$ for the sub subject area.

First, as expressed in Expression (14) below, an evaluation function $E_{pm}(M)$ for the layout of the main subject area in the input image and an evaluation function $E_{pn}(S)$ for the layout of the sub subject area in the input image are calculated.

[Expression 14]

$$E_{pm}(M) = \alpha_{pM} \cdot \exp\left(-\frac{\|P_{Dm} - P_m\|}{d}\right)$$
$$E_{pn}(S) = \alpha_{pS} \cdot \exp\left(-\frac{\|P_{Dn} - P_S\|}{d}\right) \quad (14)$$

As indicated in Expression (14), the values of the evaluation function $E_{pm}(M)$ and the evaluation function $E_{pn}(S)$ increase as the main subject area and the sub subject area approach the 3-division line intersection point.

In Expression (14), each of suffixes m and n takes the values, which are obtained when the 3-division line intersection points $P_{Di}$ are located on the diagonal line, among values which the suffix i of the 3-division line intersection point $P_{Di}$ shown in FIG. 26 takes. That is, in FIG. 26, since the 3-division line intersection points $P_{D0}$ and $P_{D3}$ and the 3-division line intersection points $P_{D1}$ and $P_{D2}$ are located on the diagonal line, the suffixes m and n are given in four combinations of (m, n)=(0, 3), (1, 2), (2, 1), and (3, 0). Therefore, when one value is determined, the other value is uniquely determined. Accordingly, the evaluation functions $E_{pm}(M)$ and $E_{pn}(S)$ are calculated by the four combinations.

The layout element elem_p expressed in Expression (15) below is calculated based on the evaluation functions $E_{pm}(M)$ and $E_{pn}(S)$, the weight coefficients $w_{Msize}$ and $w_{Ssize}$, and the weight function $\alpha_M$.

[Expression 15]

$$\text{elem\_p} = \max_m \{\alpha_M \cdot E_{pm}(M) \cdot w_{Msize} + (1 - \alpha_M) \cdot E_{pn}(S) \cdot w_{Ssize}\} \quad (15)$$

In Expression (15), on the assumption that the value in the parenthesis { } is A, max{A} (where m is recorded below max) indicates the largest value A among values A given by a predetermined value m. That is, in Expression (15), the largest value A is calculated as the layout element elem_p among the values A given in the evaluation functions $E_{pm}(M)$ and $E_{pn}(S)$ calculated in the four combinations. In Expression (15), the weight function $\alpha_M$ is the same as that described in Expression (12) and the like.

Thus, the layout element elem_p with the value which becomes larger as each of the main subject area and the sub subject area approaches each of the 3-division line intersection points lining on the diagonal line is calculated.

Even when the number of notice areas is 2 and the diagonal composition is selected as the composition pattern of the input image, the composition of the input image is evaluated based on the photography situation and the composition pattern and the score is output as the evaluation result. Thus, a user can compare the input image input from the imaging apparatus to the composition recommended on the input image, and can also confirm the evaluation result as the evaluation result for the composition of the input image, based on the composition recommended on the input image with ease.

Thus, the user can compare the input image input from the imaging apparatus to the various compositions recommended on the input image and can also confirm the evaluation result based on the various composition recommended on the input image as the evaluation result for the composition of the input image, rather than the evaluation result for a simple composition such as a sun-shaped circle composition. Therefore, the photography technique of the user can be further improved.

Even when a composition pattern other than the 3-division composition, the contrast composition, and the diagonal composition described above is selected the image processing apparatus 11 can output the evaluation result based on the selected composition pattern as long as the layout element elem_p determined depending on the composition pattern is calculated based on the reference positions of the 3-division composition and the central position of the main subject area.

The image processing apparatus scoring the compositions of an input image when an image captured by the imaging apparatus or the like is input as the input image has hitherto been described, but the imaging apparatus may have a configuration in which the composition of a captured image is scored directly.

4. Fourth Embodiment

Exemplary Configuration of Imaging Apparatus

Figure 27:
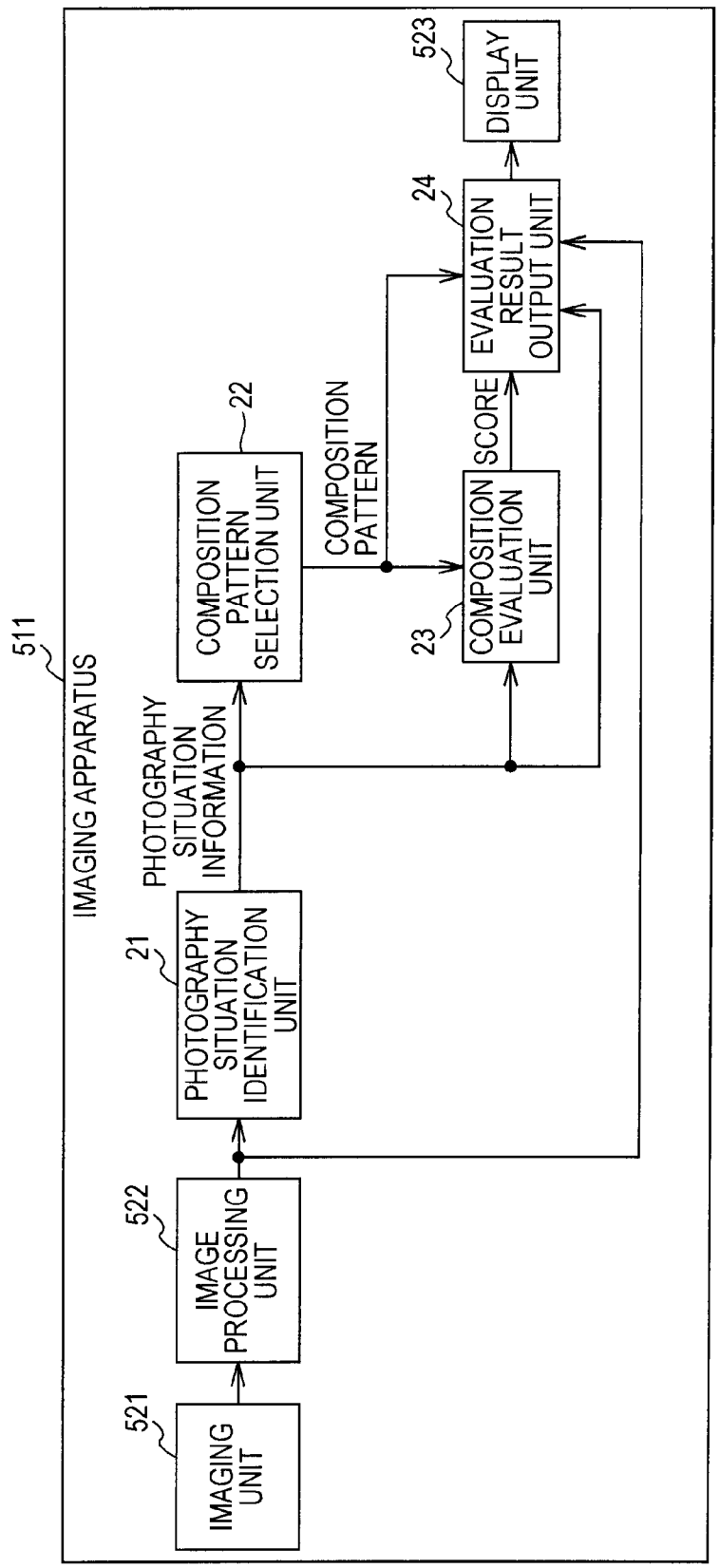
FIG. 27 is a block diagram illustrating an exemplary function configuration of an imaging apparatus consistent with an embodiment of the invention.

FIG. 27 is a diagram illustrating an exemplary configuration of an imaging apparatus configured to score the composition of a captured image. The same names and the same reference numerals as those of the function configuration of the image processing apparatus 11 in FIG. 1 are given in an imaging apparatus 511 shown in FIG. 27. The description thereof will be appropriately omitted.

That is, the imaging apparatus 511 in FIG. 27 is different from the image processing apparatus 11 in FIG. 1 in that an imaging unit 521, an image processing unit 522, and a display unit 523 are newly provided.

The evaluation result output unit 24 in FIG. 27 supplies the score from the composition evaluation unit 23, the photography situation information (the scene information and the reference area image) from the photography situation identification unit 21, and the composition pattern from the composition pattern selection unit 22 together with the captured image to the display unit 523.

The imaging unit 521 includes an optical lens, an imaging element, and an A/D (Analog/Digital) conversion unit (none of which are shown). The imaging unit 521 images a subject by receiving light incident on the optical lens by the imaging element and optically converting the incident light. The imaging unit 521 performs A/D conversion on the obtained analog image signal. The imaging unit 521 supplies digital image data (captured image) obtained through the A/D conversion to the image processing unit 522.

The image processing unit 522 performs image processing, such as a noise removal process, on the captured image from the imaging unit 521 and supplies the processed captured image to the photography situation identification unit 21.

The display unit 523 displays the scene information, the composition pattern, the score, and the reference area image supplied together with the captured image from the evaluation result output unit 24 as well as the captured image.

Image Evaluation Process of Imaging Apparatus

Figure 28:
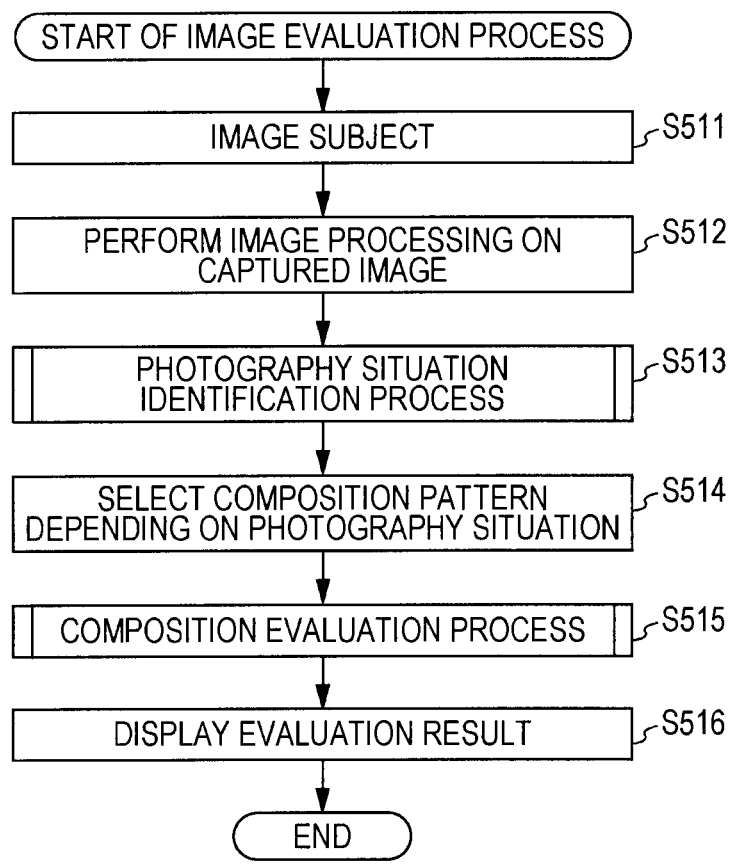
FIG. 28 is a flowchart illustrating an image evaluation process of the imaging apparatus in FIG. 27.

Next, the image evaluation process of the imaging apparatus 511 in FIG. 27 will be described with reference to the flowchart of FIG. 28. Since the processes from step S513 to S515 in the flowchart of FIG. 28 are the same as the processes from step S11 to S13 described with reference to the flowchart of FIG. 6, the description thereof will be omitted.

In step S511, the imaging unit 521 images a subject and supplies the obtained captured image to the image processing unit 522.

In step S512, the image processing unit 522 performs the image processing, such as a noise removal process, on the captured image from the imaging unit 521 and supplies the processed captured image to the photography situation identification unit 21 and the evaluation result output unit 24.

In step S516, the evaluation result output unit 24 supplies the score Score from the composition evaluation unit 23, the scene information from the scene determination unit 32, the reference area image from the color information comparison unit 33, and the composition pattern from the composition pattern selection unit 22 together with the captured image on the display unit 523. The display unit 523 displays the scene information, the composition pattern, the score, and the reference area image supplied together with the captured image from the evaluation result output unit 24 as well as the captured image.

Figure 29:
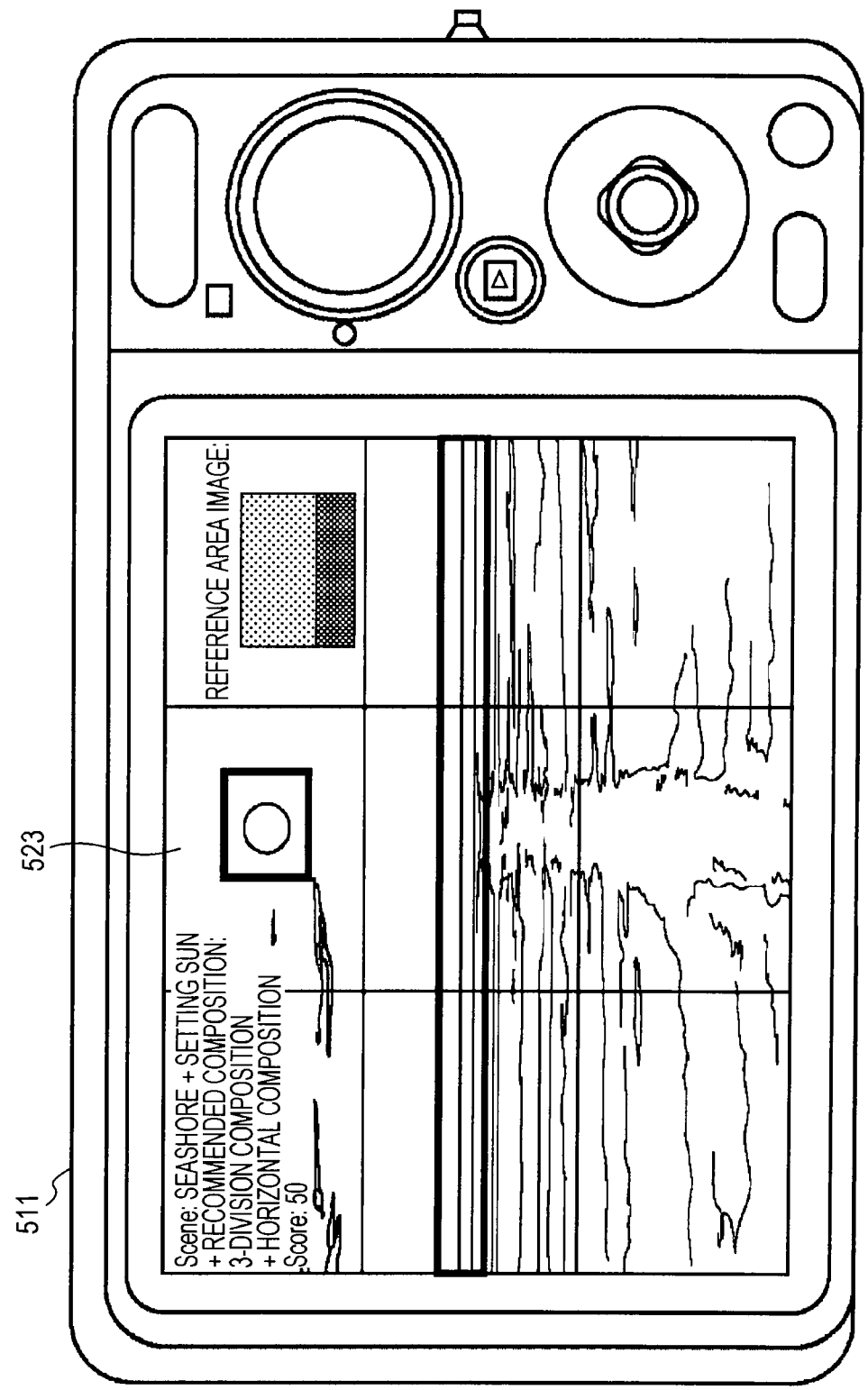
FIG. 29 is a diagram illustrating an exemplary display of a display unit of the imaging apparatus.

FIG. 29 is a diagram illustrating a display example displayed on the display unit 523 of the imaging apparatus 511.

On the display unit 523 of the imaging apparatus 511 shown in FIG. 29, as in FIG. 20, a reduced image indicating the scene information, the composition pattern, the score, and the reference area image on the captured image obtained by photographing the sun setting on the horizon at sunset on a clear day is displayed on the OSD.

Specifically, the character lines "scene: seashore+setting sun" as the scene information, "recommended composition: 3-division composition+horizontal composition" as the composition pattern, and "Score: 50" as the score are displayed on the upper left side of the captured image. In addition, a reduced image indicating the character line of "reference area image" and the reference area image are displayed on the upper right side of the captured image.

In FIG. 29, the sun as a subject and the horizon determining the color area are surrounded by a rectangular shape and are displayed. The 3-division lines indicating the 3-division composition are displayed on the entire captured image.

By the above-described process, the composition pattern is selected depending on the photography situation, the composition of the captured image is evaluated based on the photography situation and the composition pattern, and the score is output as the evaluation result. Thus, the user can compare the captured image input to the various compositions recommended on the captured image and can confirm the evaluation result with ease and in real time, based on the various composition recommended on the captured image as the evaluation result for the composition of the captured image, rather than the evaluation result for a simple composition such as a sun-shaped circle composition. Therefore, the photography technique of the user can be further improved.

Figure 30:
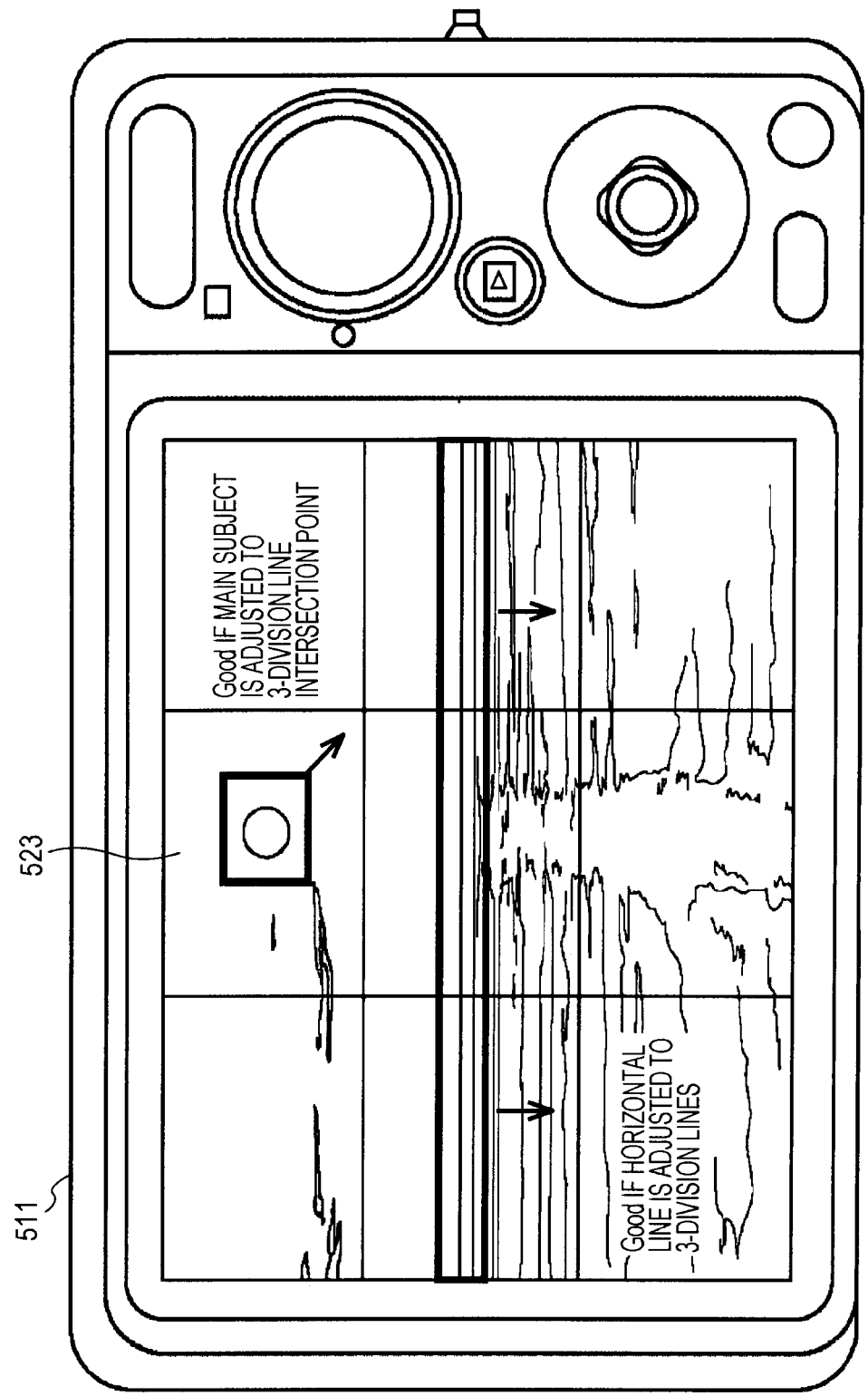
FIG. 30 is a diagram illustrating another exemplary display of the display unit of the imaging apparatus.

By operating an operator or the like including a button or a dial disposed on the right side of the display unit 523 of the imaging apparatus 511 in FIG. 29, as shown in FIG. 30, an advice indicating a message that the score has increased may be displayed for the user.

In FIG. 30, the captured image displayed on the display unit 523 of the imaging apparatus 511, the 3-division line indicating the 3-division composition and the advice for the user are displayed. Specifically, an arrow suggesting adjusting the sun as a subject to the 3-division line intersection point and an advice "Good IF MAIN SUBJECT IS ADJUSTED TO 3-DIVISION LINE INTERSECTION POINT" are displayed on the upper right side on the display unit 523. An arrow suggesting adjusting the horizon determining the color area of the captured image to the vertical 3-division line on the lower side and an advice "Good IF HORIZON IS ADJUSTED TO 3-DIVISION LINE" are displayed.

For example, the display is implemented by calculating a movement destination (direction) of the central position of the notice area, in which the distance is further decreased, based on the distance, which can be calculated by the layout evaluation unit 111 of the composition evaluation unit 23, between the central position of the notice area (main subject area) and the reference position. Thus, the value of the layout element is further increased and thus the score is further increased.

Accordingly, by displaying the advice for the user so that the score is further increased, the user can understand a method of adjusting a subject to a recommended composition for the image being captured. Therefore, the photography technique of the user can be further improved.

The quantified score is output (or displayed) as the evaluation result for the composition of the input image (or the captured image), as described above. However, a character (for example, A to E) or an icon may be output as a 5-level evaluation result based on the quantified score. Alternatively, figures obtained by graphing the values of the layout element, the significance element, and the color element may be displayed.

The above-described series of processes may be executed by hardware or software. When the series of processes is executed by software, a program including the software is installed in a computer embedded with dedicated hardware or a computer such as a general personal computer, capable of installing various programs and executing various functions, from a program recording medium.

Figure 31:
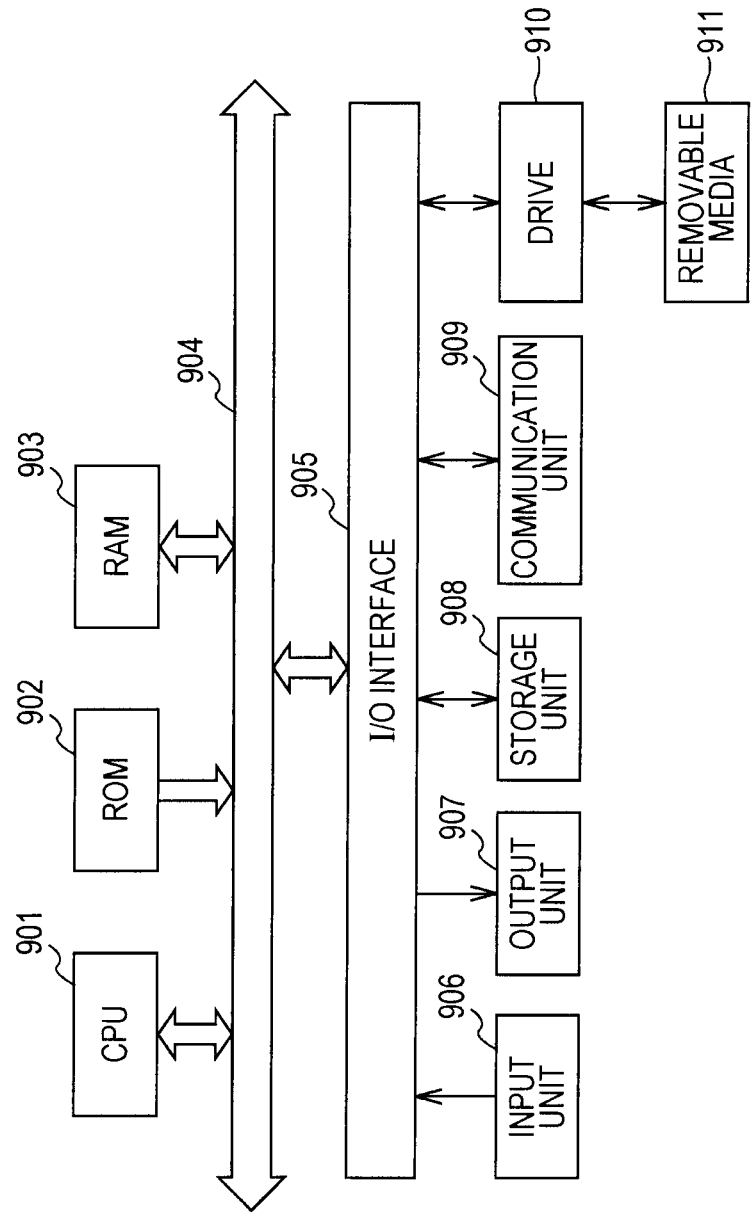
FIG. 31 is a block diagram illustrating an exemplary hardware configuration of a computer.

FIG. 31 is a block diagram illustrating an exemplary hardware configuration of a computer executing the above-described series of processes by a program.

In the computer, a CPU (Central Processing Unit) 901, a ROM (Read-Only Memory) 902, and a RAM (Random Access Memory) 903 are connected to each other via a bus 904.

An I/O interface 905 is connected to the bus 904. An input unit 906 configured by a keyboard, a mouse, a microphone, and the like, an output unit 907 configured by a display, a speaker, and the like, a storage unit 908 configured by a hard disk, a non-volatile memory, and the like, a communication unit 909 configured by a network interface or the like, and a drive 910 driving a removable media 911 (i.e., a non-transitory, computer-readable storage medium) such as a magnetic disk, an optical disk, a magneto-optic disk, or a semiconductor memory are connected to the I/O interface 905.

In the computer having such a configuration, the CPU 901 loads and executes, for example, a program stored in the storage unit 908 on the RAM 903 via the I/O interface 905 and the bus 904 to perform the above-described series of processes.

The program executed by the computer (CPU 901) is recorded in the removable media 911 which is a package media configured by a magnetic disk (including a flexible disk), an optical disk (CD-ROM (Compact Disc-Read Only Memory), DVD (Digital Versatile Disc), and the like), a magneto-optical disk, a semiconductor memory, or the like. Alternatively, the program is provided via a wired or wireless transmission media such as a local area network, the Internet, or digital satellite broadcasting.

The program may be installed to the storage unit 908 via the I/O interface 905 by mounting the removable media 911 on the drive 910. The program may be received via a wired or wireless transmission medium through the communication unit 909 and may be installed in the storage unit 908. Alternatively, the program may be installed in advance to the ROM 902 and the storage unit 908.

The program executed by the computer may be a program performing the process chronologically in the order described in the specification or may be a program performing the process, for example, at a necessary timing, in response to a call or in parallel.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for evaluating the quality of an input image, comprising:
    a composition pattern selection unit configured to select a composition pattern from a plurality of predefined composition patterns based on an attribute of the input image;
    a composition evaluation unit configured to evaluate the input image based on the composition pattern and the attribute; and
    an evaluation result output unit configured to output to a display the input image and an indication of a result of the evaluation.

2. The apparatus of claim 1, comprising a subject area determination unit configured to determine at least one area of the input image containing a subject of the input image.

3. The apparatus of claim 2, wherein:
    the at least one area is a subject area; and
    the subject area determination unit is configured to determine a position of the subject area in the input image.

4. The apparatus of claim 3, wherein the subject area determination unit is configured to determine a size of the subject area in the input image.

5. The apparatus of claim 4, wherein the attribute of the input image includes at least one of the size or the position of the subject area in the input image.

6. The apparatus of claim 5, wherein the composition evaluation unit is configured to evaluate a layout quality of the input image.

7. The apparatus of claim 2, wherein the attribute of the input image includes the number of areas of the input image determined by the subject area determination unit.

8. The apparatus of claim 2, wherein:
    the at least one area is a subject area;
    the attribute of the input image includes a significance of the subject area; and
    the composition evaluation unit is configured to evaluate the significance of the subject area.

9. The apparatus of claim 2, comprising a similarity calculation unit configured to calculate a similarity between the input image and a reference image, wherein the attribute of the input image includes:
    the similarity; and
    information about the at least one area.

10. The apparatus of claim 2, wherein the at least one area is a rectangular subject area that surrounds the subject.

11. The apparatus of claim 1, comprising a scene determination unit configured to determine a scene of the input image.

12. The apparatus of claim 11, wherein the attribute of the input image includes the scene of the input image.

13. The apparatus of claim 1, comprising a similarity calculation unit configured to calculate a similarity between the input image and a reference image.

14. The apparatus of claim 13, comprising an area division unit configured to divide the input image into color areas including the same or similar colors.

15. The apparatus of claim 13, wherein the similarity is a similarity between shapes of the color areas of the input image and shapes of color areas of the reference image.

16. The apparatus of claim 13, wherein the similarity is a similarity between colors of the input image and colors of the reference image.

17. The apparatus of claim 13, wherein the attribute of the input image includes the similarity.

18. The apparatus of claim 13, wherein the composition evaluation unit is configured to evaluate a color quality of the input image.

19. A method for evaluating the quality of an input image, comprising using a computer to perform the steps of:
    selecting a composition pattern from a plurality of predefined composition patterns based on an attribute of the input image;

evaluating the input image based on the composition pattern and the attribute; and outputting to a display the input image and an indication of a result of the evaluation.

20. A non-transitory, computer-readable storage medium storing a program that, when executed by a processor, causes an apparatus to perform a method for evaluating the quality of an input image, the method comprising;

selecting a composition pattern from a plurality of predefined composition patterns based on an attribute of the input image;

evaluating the input image based on the composition pattern and the attribute; and outputting to a display the input image and an indication of a result of the evaluation.

21. An imaging apparatus, comprising:

an imaging unit configured to capture an image;

an image processing unit configured to process the captured image;

a composition pattern selection unit configured to select a composition pattern from a plurality of predefined composition patterns based on an attribute of the processed image;

a composition evaluation unit configured to evaluate the processed image based on the composition pattern and the attribute;

a display; and an evaluation result output unit configured to output to the display the processed image and an indication of a result of the evaluation.

22. A method for capturing and evaluating the quality of an image, comprising:

capturing the image;

processing the captured image;

selecting a composition pattern from a plurality of predefined composition patterns based on an attribute of the processed image;

evaluating the processed image based on the composition pattern and the attribute; and outputting to a display the processed image and an indication of a result of the evaluation.

* * * * *